(12) United States Patent
Buchanan et al.

(10) Patent No.: US 11,680,436 B2
(45) Date of Patent: Jun. 20, 2023

(54) MONITORING SYSTEM TO IDENTIFY UNREGISTERED PERSONS ENTERING PREMISES AND TO SECURE ROOMS CONTAINING REGISTERED OCCUPANTS

(71) Applicant: Smarter Building Technologies Alliance, Inc., Long Beach, CA (US)

(72) Inventors: Benjamin Buchanan, Long Beach, CA (US); Tony Garcia, Rocklin, CA (US); Shane Acernese, Drums, PA (US); Rich Hanlon, Georgetown, MA (US); Chris Loeser, North Olmsted, OH (US); Kevin Martin, Gloucester, MA (US)

(73) Assignee: Smarter Building Technologies Alliance, Inc., Long Beach, CA (US)

( * ) Notice: Subject to any disclaimer, the term of this patent is extended or adjusted under 35 U.S.C. 154(b) by 0 days.

(21) Appl. No.: 16/679,799

(22) Filed: Nov. 11, 2019

(65) Prior Publication Data

US 2021/0140220 A1    May 13, 2021

(51) Int. Cl.
| | |
|---|---|
| *E05F 15/72* | (2015.01) |
| *G08B 15/00* | (2006.01) |
| *G08B 21/02* | (2006.01) |
| *G08B 25/10* | (2006.01) |
| *E05F 15/77* | (2015.01) |
| *G05B 15/02* | (2006.01) |
| *E05B 47/00* | (2006.01) |
| *G07C 9/28* | (2020.01) |

(52) U.S. Cl.
CPC .............. *E05F 15/72* (2015.01); *E05B 47/00* (2013.01); *E05F 15/77* (2015.01); *G05B 15/02* (2013.01); *G07C 9/28* (2020.01); *G08B 15/004* (2013.01); *G08B 21/02* (2013.01); *G08B 25/10* (2013.01); *E05Y 2900/132* (2013.01)

(58) Field of Classification Search
None
See application file for complete search history.

(56) References Cited

U.S. PATENT DOCUMENTS

| | | | | |
|---|---|---|---|---|
| 4,785,580 | A * | 11/1988 | Olesen | E05D 15/02 49/44 |
| 9,693,181 | B1 * | 6/2017 | Albouyeh | G08B 13/19617 |
| 11,574,206 | B2 * | 2/2023 | Butler, Jr. | G08B 13/122 |
| 2005/0024208 | A1 * | 2/2005 | Maki | G08B 13/2497 340/545.3 |
| 2010/0245087 | A1 * | 9/2010 | Gerner | G07C 9/28 340/541 |
| 2016/0035196 | A1 * | 2/2016 | Chan | G08B 25/14 340/541 |

* cited by examiner

*Primary Examiner* — Thomas S McCormack
(74) *Attorney, Agent, or Firm* — DLA Piper LLP (US)

(57) ABSTRACT

The disclosed embodiments provide an improved monitoring and security system to identify the presence of persons within a premises, to track the relative location of the person as he or she traverse the premises, and to generate an alert and optionally enter a lockdown mode if the person does not possess a pre-registered computing device or wireless transceiver. In the lockdown mode, doors optionally can be shut and locked through remote or local control or automatically if the distance between the person and the particular door falls below a predetermined threshold.

12 Claims, 26 Drawing Sheets

FIGURE 18

Data Structure
1800
(Per Client Device 601 and Wireless Transceiver 602)

| Unique Identifier 1801 |
|---|
| Phone Number 1802 |
| Version Number 1803 |
| User Name 1804 |
| Parent or Contact Name 1805 |
| Parent or Contact Phone Number 1806 |
| Module Identifier 1807 |
| Timestamp 1808 |

FIGURE 25

| Room 102a | Room 102a | ... |
|---|---|---|
| Time Period 2501 | Time Period 2502 | |
| Unique Identifier 1801-A (Student A) | | |
| Unique Identifier 1801-B (Student B) | | |
| *Unique Identifier 1801-F (Student F) – Absent* | | |
| Unique Identifier 1801-H (Teacher H) | | |

Data Structure 2500

FIGURE 26

| Module 201-1 | Module 201-2 | ... | Module 201-N |
|---|---|---|---|
| Unique Identifier 1801-A (Student A) | Unknown User | | Unique Identifier 1801-Z (Administrator Z) |
| Unique Identifier 1801-B (Student B) | Unique Identifier 1801-B (Student B) | | |
| Unique Identifier 1801-H (Teacher H) | | | |
| | | | |

Data Structure 2600

MONITORING SYSTEM TO IDENTIFY UNREGISTERED PERSONS ENTERING PREMISES AND TO SECURE ROOMS CONTAINING REGISTERED OCCUPANTS

FIELD OF THE DISCLOSURE

The disclosed embodiments provide an improved monitoring and security system to identify the presence of persons within a premises, to track the relative location of the person as he or she traverse the premises, and to generate an alert and optionally enter a lockdown mode if the person does not possess a pre-registered computing device or wireless transceiver.

BACKGROUND

It is increasingly difficult to provide adequate security in an open premises, where there are numerous points of entry to the premises and it is not feasible to require each person to be frisked by a security guard or to walk through a metal detector when they enter the premises. This is typically true for most schools, office complexes, community fairs, shopping malls, and other facilities. This problem has been shown to be particularly acute in light of the recent mass shootings at schools.

FIG. 1 depicts exemplary premises 100. Buildings 101, 102, and 103 are located on premises 100. Building 101 comprises rooms 101a, 101b, and 101c; building 102 comprises room 102a, room 102b, room 102c, and room 102d; and building 103 comprises 103a and 103b. In this particular example, it will be assumed that premises 100 is an elementary school, although it is to be understood that premises 100 can be any type of premises.

There is no fence or enclosure around the entirety of premises 100, and as a result, there are numerous points of entry to premises 100. At the particular time depicted in FIG. 1, there are five individuals located on premises 100: persons 110a, 110b, 110c, 110d, and 110e. Persons 110a and 110b are in room 102a, person 110d is in room 101a, and persons 110c and 110e are on the grounds of premises 100 but not in any building or room.

One drawback in the prior art is that there is no way to automatically identify persons 110a, 110b, 110c, 110d, and 110e except through visual inspection by another person. Even then, that person may not be able to determine the identity of persons 110a, 110b, 110c, 110d, and 110e if he or she does not already know such person or if such person does not wish to identify himself or herself. As a result, it is extremely difficult to ascertain whether each person who is located within premises 100 is someone who has a legitimate reason for being on premises 100 (e.g., the person is a teacher) or whether the person has visited premises 100 for a malicious reason (e.g., the person will soon become an active shooter).

What is needed is a system and method for automatically identifying the presence of all persons within premises 100 and to determine if the person is a known person or an unknown person. What is further needed is the ability to track all persons within premises 100 and to indicate each person's relative location within premises 100 on the display of a computing device. What is further needed is a way to automatically lock down rooms or buildings when there is a potential security threat.

BRIEF SUMMARY OF THE INVENTION

The disclosed embodiments provide an improved monitoring and security system to identify the presence of persons within a premises, to track the relative location of the person as he or she traverse the premises, and to generate an alert and optionally enter a lockdown mode if the person does not possess a pre-registered computing device or wireless transceiver. In the lockdown mode, doors optionally can be shut and locked through remote or local control or automatically if the distance between the person and the particular door falls below a predetermined threshold.

In one embodiment, a method of detecting an unknown person within a premises and performing a lockdown procedure comprises monitoring, by a plurality of modules, a premises, wherein each module comprises an occupancy sensor and a wireless transceiver; detecting, by an occupancy sensor in one of the plurality of modules, a person within the premises; attempting to obtain, by a wireless transceiver in the one of the plurality of modules, a device identifier for a computing device in proximity to the person; and when no device identifier is obtained, performing a lockdown procedure comprising automatically closing a door based on a location of the person.

In another embodiment, a system for detecting an unknown person and performing a lockdown procedure comprises a plurality of modules, each of the plurality of modules comprising an occupancy sensor and a wireless transceiver; a wireless gateway for communicating with one or more of the plurality of modules; and a server coupled to the wireless gateway, wherein the server is configured to instruct a wireless transceiver in a first module to locate a computing device within a wireless footprint of the first module when the occupancy sensor in the first module detects a person within an occupancy footprint of the first module and to implement a lockdown procedure when no computing device is located, the lockdown procedure comprising automatically closing and locking a door in proximity to the person.

BRIEF DESCRIPTION OF THE DRAWINGS

FIG. 18 depicts a data structure created for a client device or wireless transceiver.

FIG. 25 depicts a data structure that contains a list of all registered users who are assigned to a particular room during each time period during a school day.

FIG. 26 depicts a data structure indicating the computing devices and transceivers that are within the wireless footprints of each particular module.

DETAILED DESCRIPTION OF PREFERRED EMBODIMENTS

Figure 1:
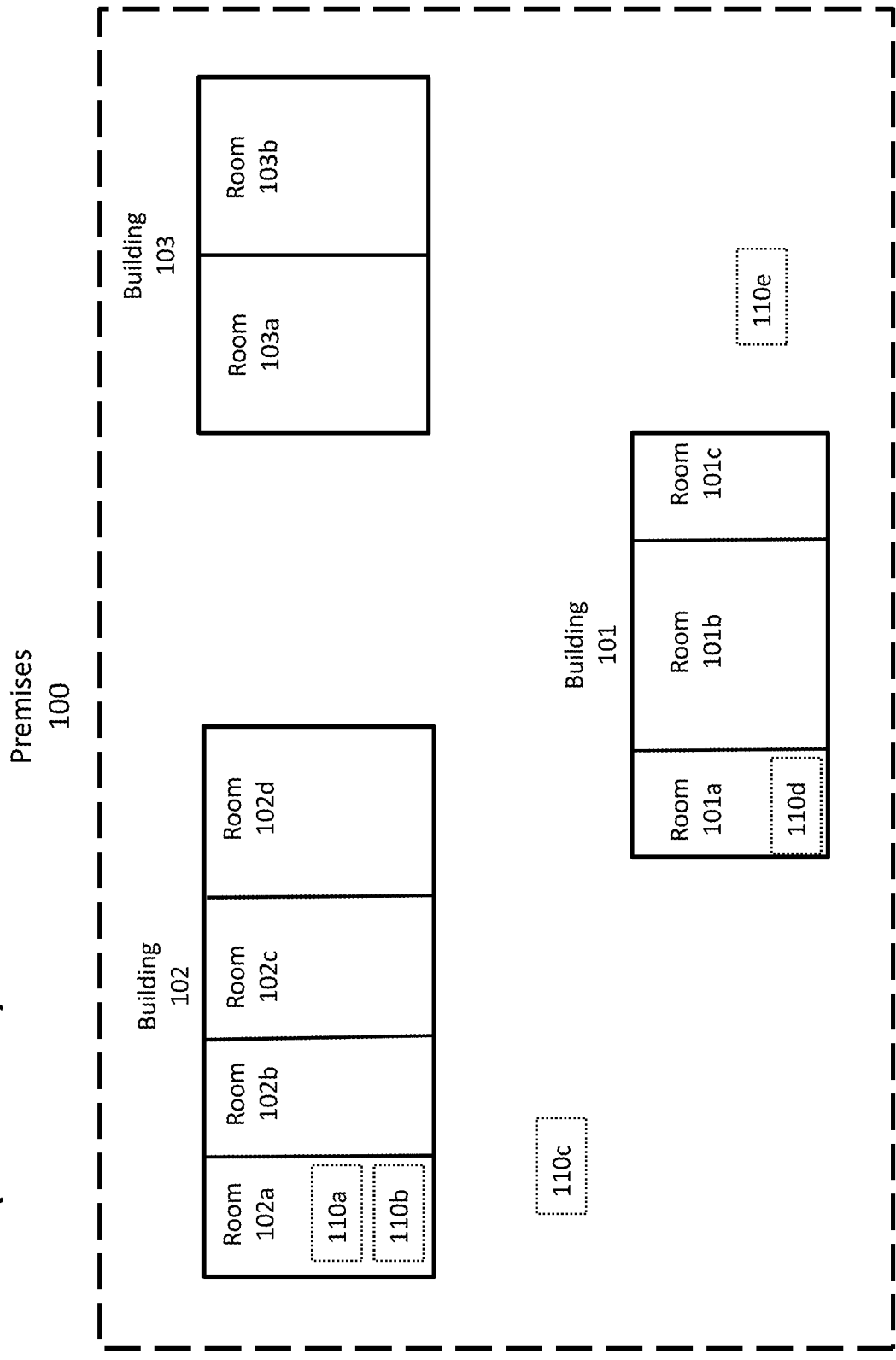
FIG. 1 depicts a prior art premises.
Figure 2:
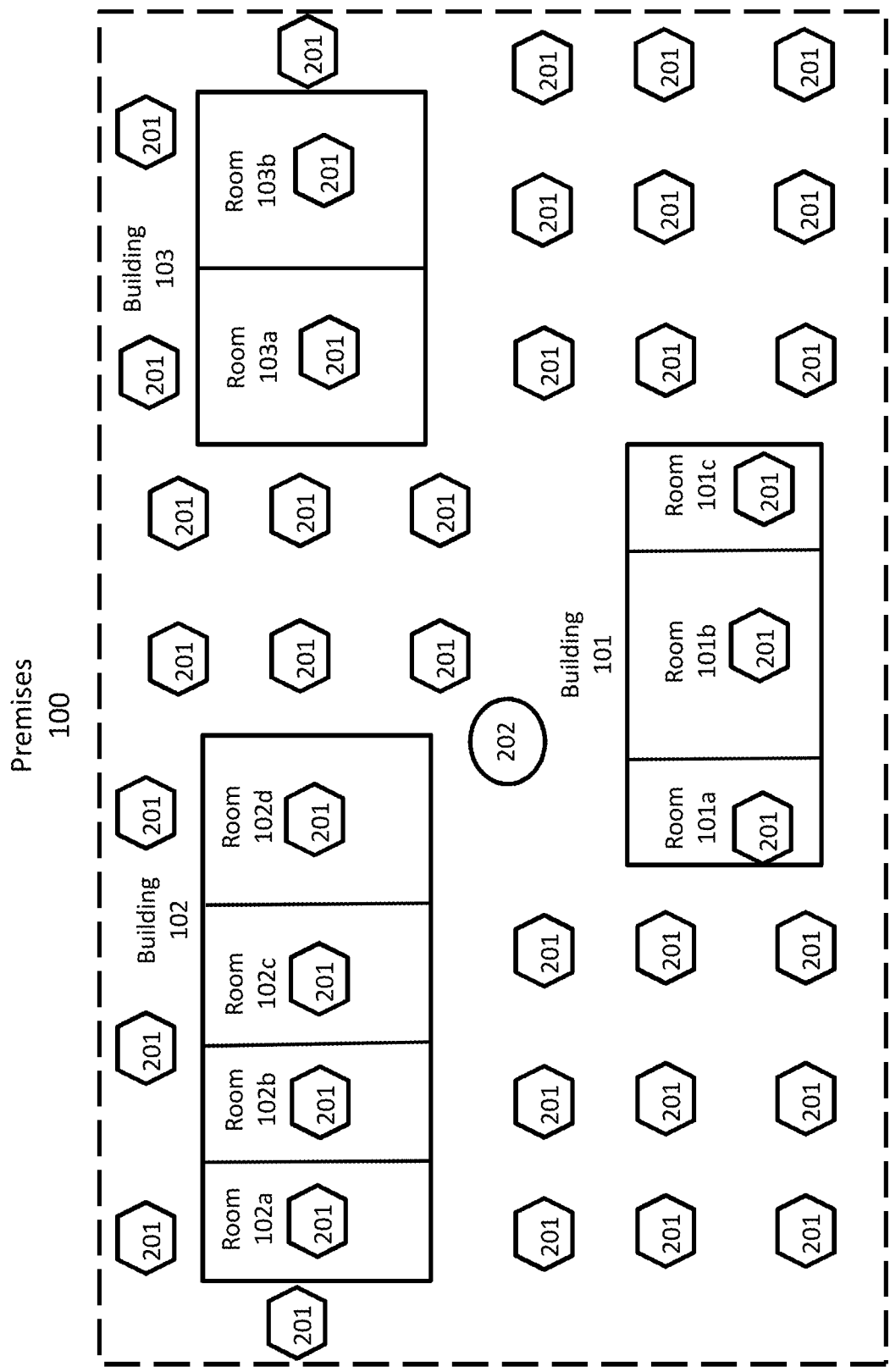
FIG. 2 depicts modules and a gateway installed within a premises.

FIG. 2 depicts one embodiment of the invention. A plurality of modules 201 are installed throughout premises 100. For example, modules 201 can be installed as fixtures throughout premises 100. Gateway 202 optionally is placed within premises 100 as well.

Figure 3:
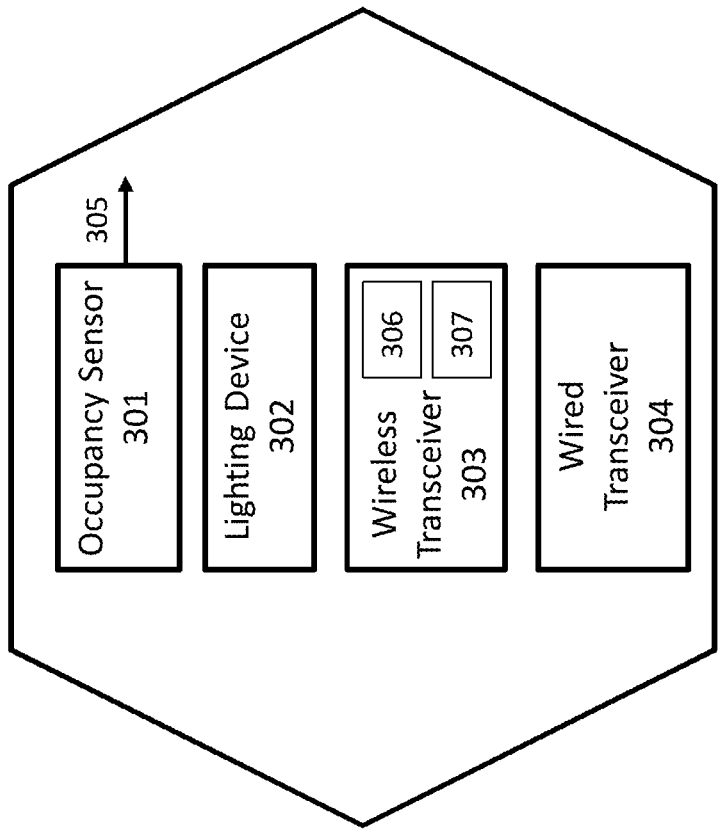
FIG. 3 depicts aspects of a module.

FIG. 3 depicts module 201 in greater detail. Module 201 comprises occupancy sensor 301, lighting device 302, wireless transceiver 303, and optionally, wired transceiver 304.

Figure 4:
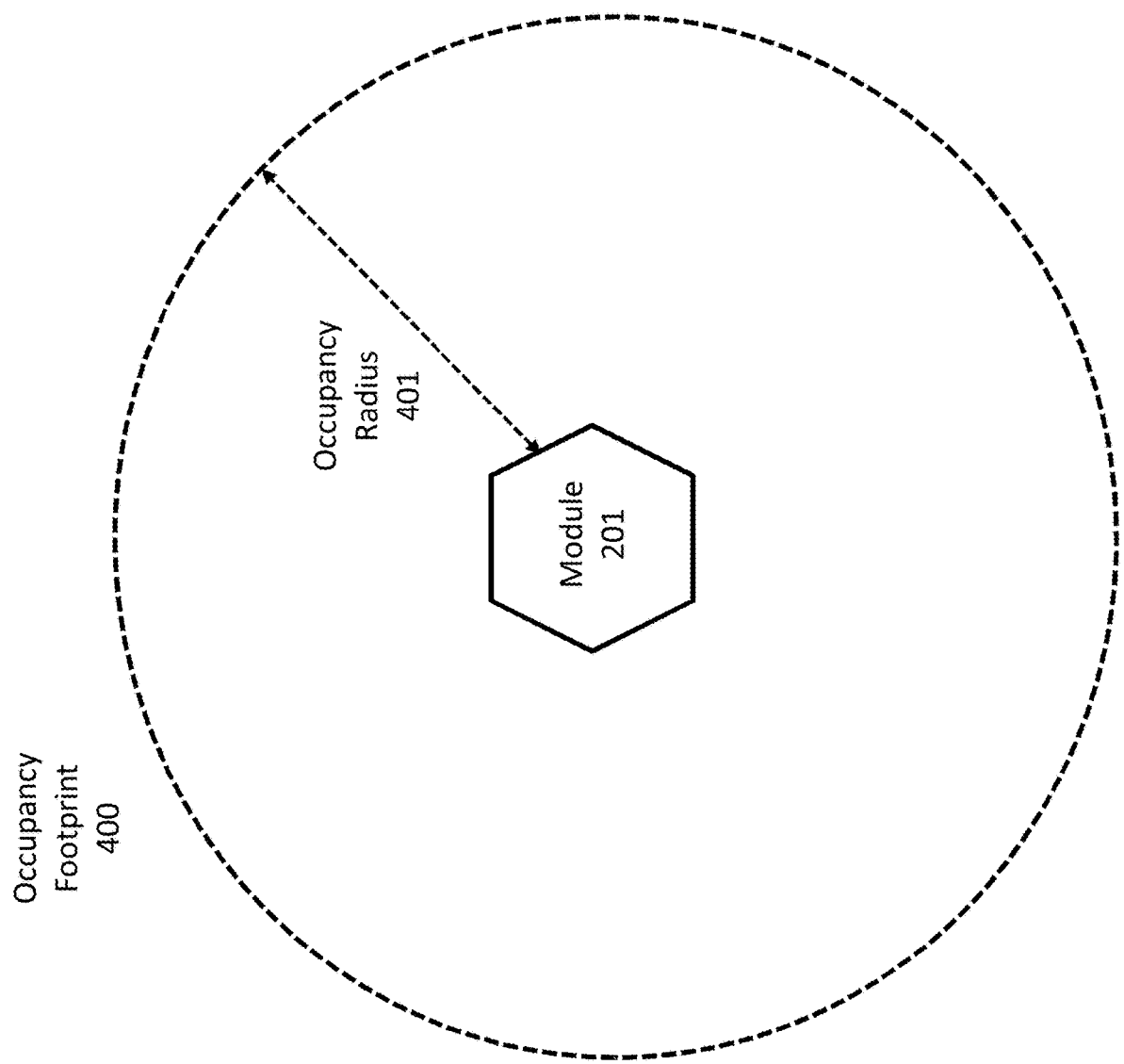
FIG. 4 depicts an occupancy footprint for the module.

Occupancy sensor 301 is a motion detecting device that can detect the presence of a person within occupancy radius 401 (shown in FIG. 4, where occupancy footprint 400 is the area in which occupancy is detected) using infrared, ultrasonic, microwave, or other technology. Occupancy sensor 301 generates output 305. In one configuration, output 305 is a single-bit digital output, where output 305 is a '0' when no motion is detected and is a '1' when motion is detected, or vice-versa.

Lighting device 302 is a device that emits light, such as an incandescent light bulb fixture, a fluorescent light bulb fixture, or an LED fixture. The presence of lighting device 302 makes the use of module 201 extremely practical, as existing lighting devices in premises 100 can be replaced with module 201. Optionally, module 201 receives its power from an existing light socket. Thus, module 201 can be installed in the ceiling of a building, such as buildings 101, 102, and 103, and on lamp posts outside of a building, in the same manner that traditional lighting fixtures are installed.

Wireless transceiver 303 is used to communicate with client devices 601 (discussed below with reference to FIGS. 6 and 9), other modules 201, and gateway 202 within a certain radius.

Wireless transceiver 303 optionally comprises a plurality of wireless transceiver modules, such as wireless transceiver modules 306 and 307, each of which can engage in wireless communications using the same or a different wireless protocol. For example, wireless transceiver module 306 can engage in a wireless protocol such as the protocols known by the trademarks BLUETOOTH, ZIGBEE, RFID, WIFI, 3G, 4G, 5G, LTE, or other known protocols, and wireless transceiver module 307 can engage in the same or a different one of those protocols.

Figure 5:
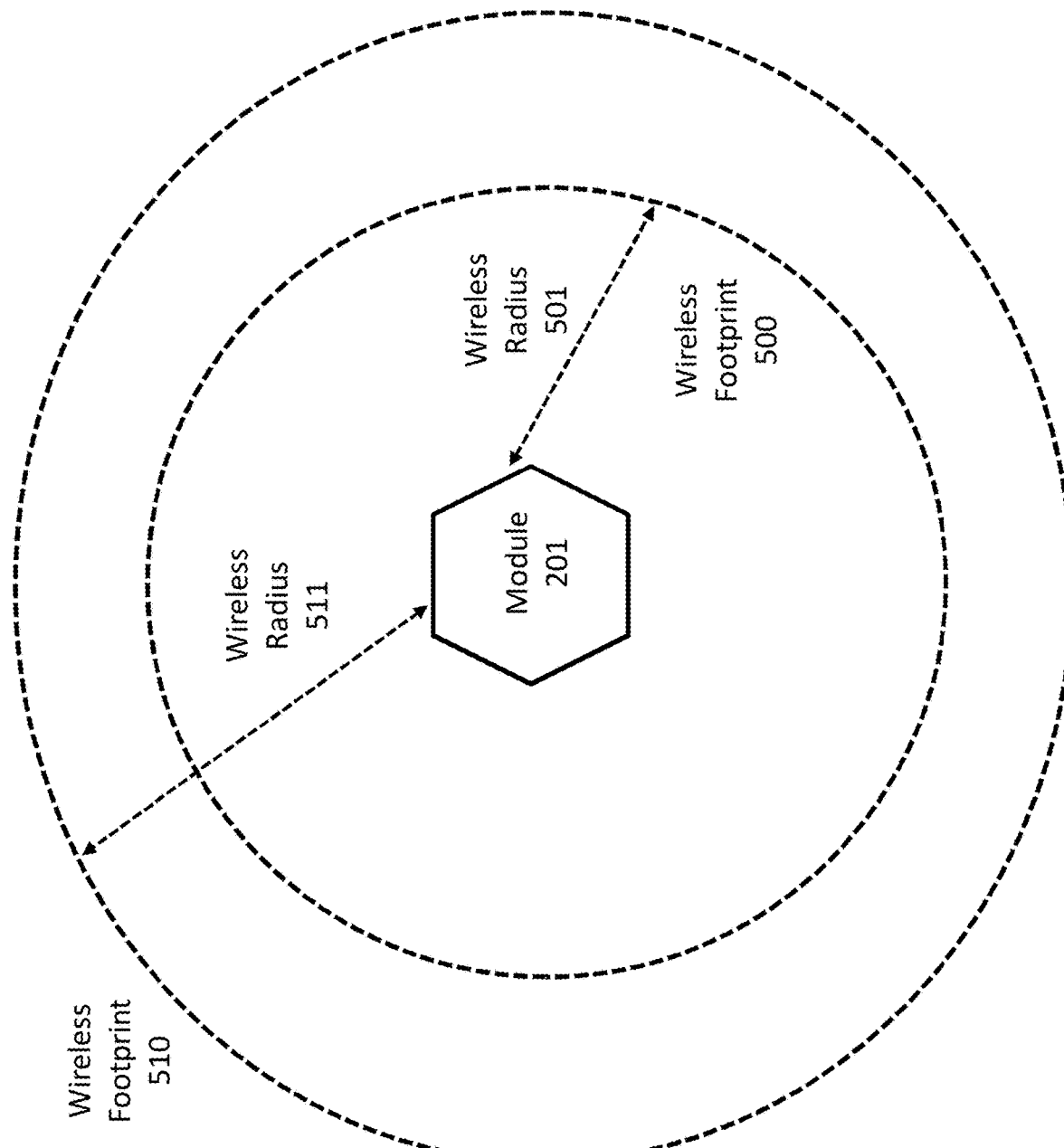
FIG. 5 depicts wireless footprints for the module.

In one embodiment, wireless transceiver module 306 communicates using a first wireless protocol (such as the protocol known by the trademark BLUETOOTH) with devices within radius 501 (shown in FIG. 5, where wireless footprint 500 is the area in which wireless transceiver module 306 can communicate), and wireless transceiver module 307 communicates using a second wireless protocol (such as the protocol known by the trademark WIFI) with gateway 203 within radius 511 (shown in FIG. 5, where wireless footprint 510 is the area in which wireless transceiver module 307 can communicate).

Optionally, wireless transceiver 303 can comprise additional wireless transceiver modules, such as a specialized video transceiver module.

Wired transceiver 304 is optional. When present, wired transceiver 304 can communicate with other modules 201 or with gateway 202 using a wired communication process, such as the wired protocol known as ETHERNET, or through known wired interfaces such as those known by the trademarks or terms HDMI, DVD-D, BNC or S-Video.

Figure 6:
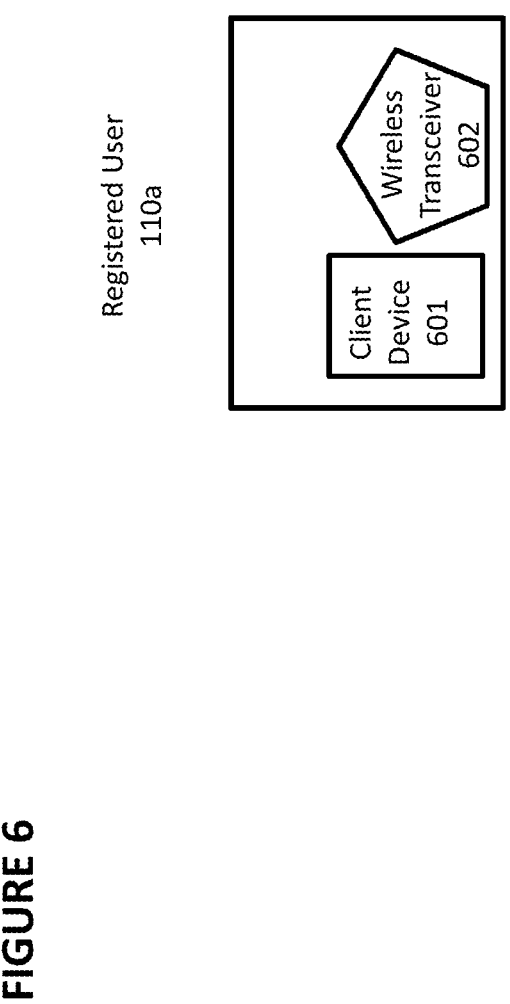
FIG. 6 depicts a registered user who possesses a client device and a wireless transceiver.

FIG. 6 depicts exemplary registered user 110a. Registered user 110a can be, for example, a teacher or student in the school operated within premises 100. Registered user 110a holds or stores client device 601 and/or wireless transceiver 602 on his or her person. For example, client device 601 can be registered user 110a's smartphone, and wireless transceiver 602 can be embedded in an ID card or lanyard worn by registered user 110a. Each user registers his or her client device 601 and wireless transceiver 602 with server 1400 (shown in FIG. 14)) or registration device 1401 (also shown in FIG. 14), as described in further detail below with reference to FIGS. 18-19. Registration device 1401 optionally can communicate with client device 601 using Near Field Communication (NFC) technology. For example, the user can hold client device 601 near registration device 1401, which will then activate client device 601 using an NFC session.

Figure 7:
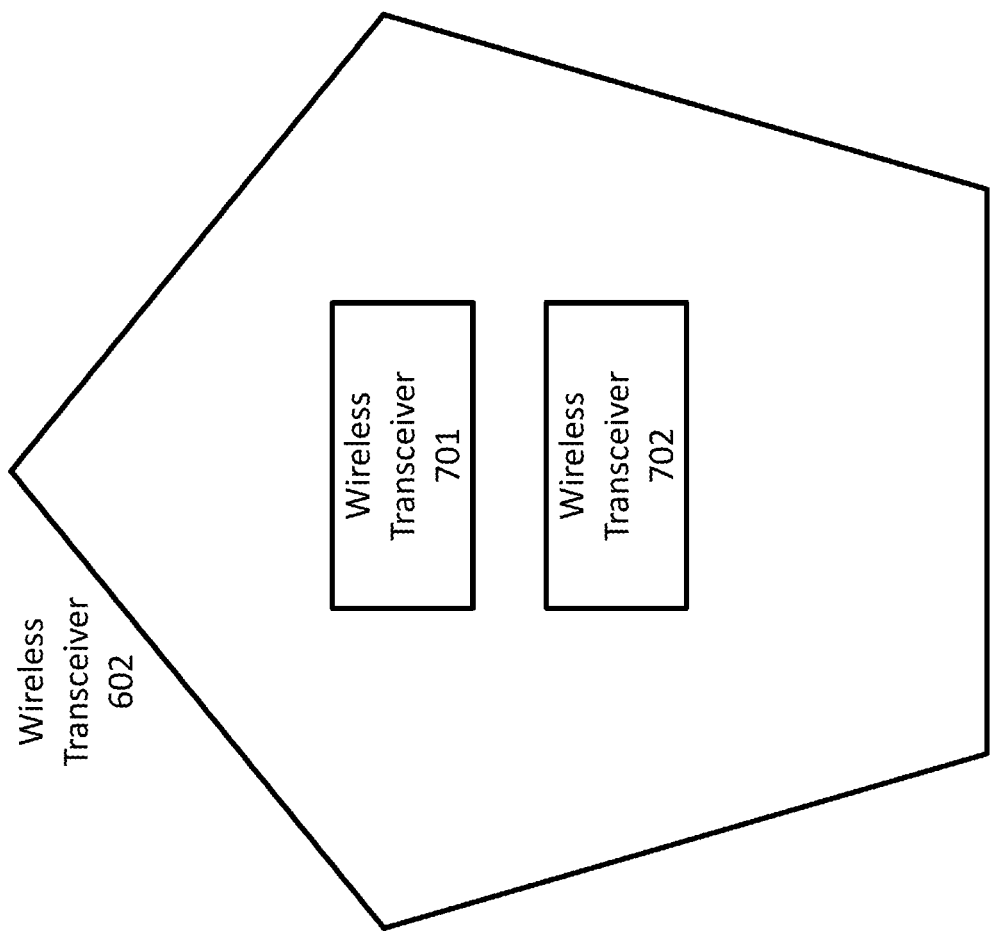
FIG. 7 depicts aspects of a wireless transceiver.

FIG. 7 depicts wireless transceiver 602 in greater detail. Wireless transceiver 602 is used to communicate with client devices 601, modules 201, other wireless transceivers 602, and gateway 202 within a certain radius. Wireless transceiver 602 optionally comprises a plurality of wireless transceiver modules, such as wireless transceiver modules 701 and 702, each of which can engage in wireless communications using the same or different wireless protocols. For example, wireless transceiver module 701 can engage in a wireless protocol such as the protocols known by the trademarks BLUETOOTH, ZIGBEE, RFID, WIFI, 3G, 4G, 5G, LTE, or other known protocols, and wireless transceiver module 702 can engage in the same or a different one of those protocols. Wireless transceiver modules 701 and 702 can be identical to wireless transceivers 306 and 307, or they might be different. For example, they have different sizes of wireless footprints.

Figure 8:
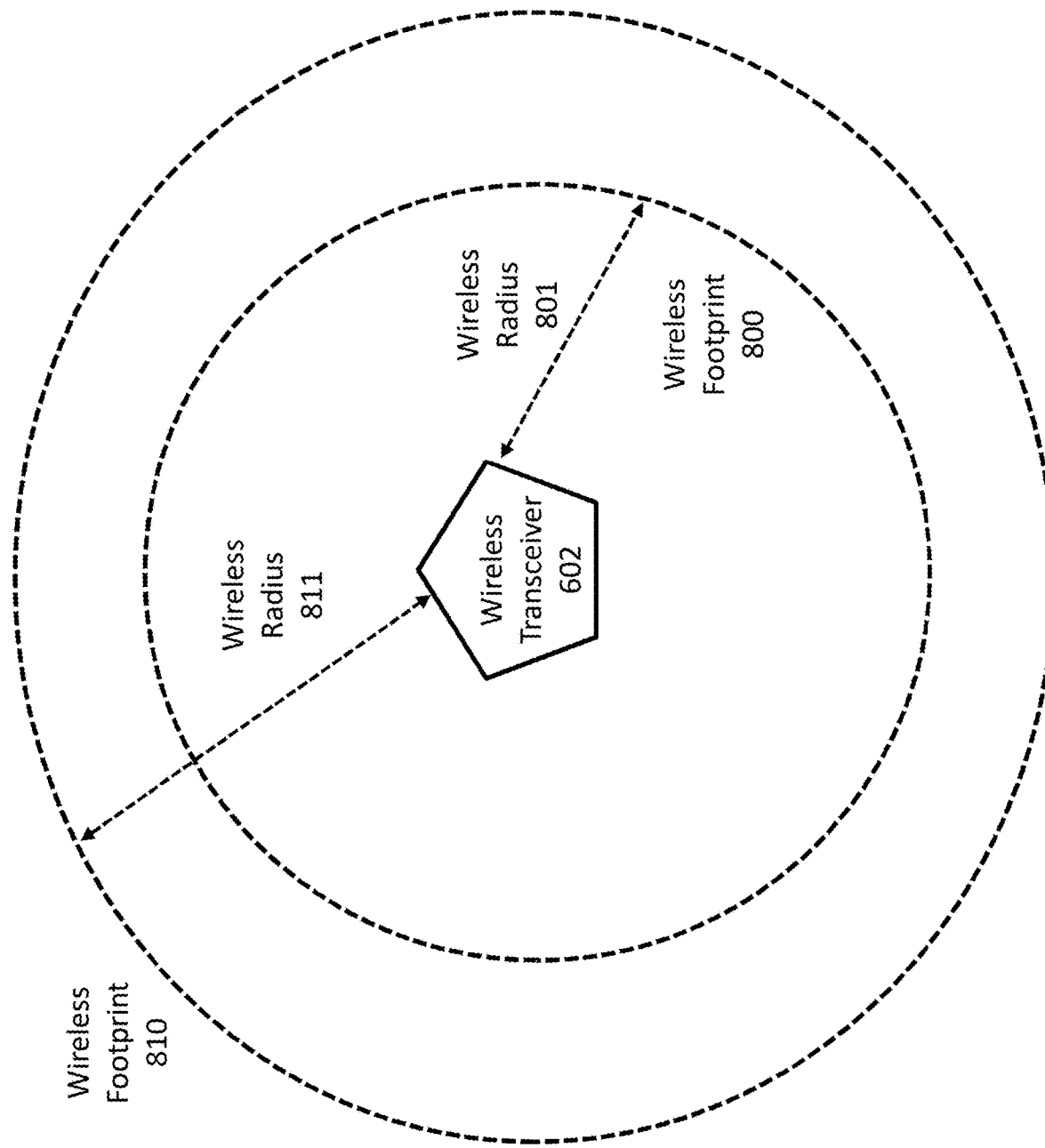
FIG. 8 depicts wireless footprints for the wireless transceiver.

In one embodiment, wireless transceiver module 701 communicates using a first wireless protocol (such as the wireless protocol known by the trademark BLUETOOTH) with devices within radius 801 (shown in in FIG. 8, where wireless footprint 800 is the area in which wireless transceiver module 701 can communicate), and wireless transceiver module 702 communicates using a second wireless protocol (such as the wireless protocol known by the trademark WIFI) with gateway 202 within radius 811 (shown in FIG. 8, where wireless footprint 810 is the area in which wireless transceiver module 703 can communicate).

With reference again to FIG. 2, modules 201 ideally will be installed within premises 100 in such a manner that the entirety of premises 100, or substantially the entirety of premises 100, will be covered by one or more wireless footprints 500 and/or 510 of modules 201 and by one or more occupancy footprints 400 of modules 201, thereby eliminating or reducing the presence of any "dead zones"

within premises 100 that are not sensed by any occupancy sensor 301 or that are not within wireless range of any wireless transceiver 303.

Gateway 202 optionally can be used. Gateway 202 itself comprises one or more wireless transceivers (which can be identical to or different than wireless transceivers 303, 306, 307, 602, 701, and/or 702) and, optionally, one or more wired transceivers, and is capable of establishing a dedicated wireless network within premises 100. Gateway 202 also can be coupled to server 1400 (described below) and/or to the Internet over a wireless or wired connection.

Gateway 202, when present, will be located in such a manner that it is within wireless footprints 510 and 710 of one or more modules 201. Optionally, more than one gateway 202 can be installed within premises 100, and each gateway 202 can placed within a wireless footprint of one or more other gateways. Thus, gateway 202, modules 201, client devices 601, and wireless transceivers 602 each participate in one or more wireless networks.

Figure 9:
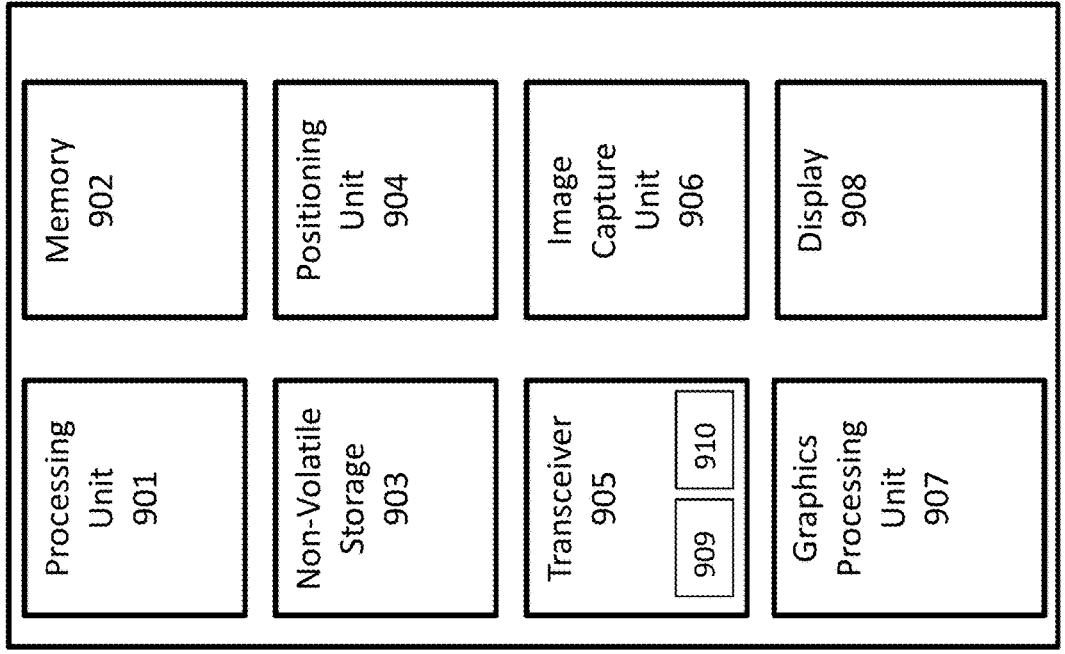
FIG. 9 depicts prior art hardware components of a client device.

FIG. 9 depicts hardware components of client device 601. These hardware components are known in the prior art. Client device 601 is a computing device that comprises processing unit 901, memory 902, non-volatile storage 903, positioning unit 904, transceiver 905, image capture unit 906, graphics processing unit 907, and display 908. Client device 601 can be a smartphone, notebook computer, tablet, desktop computer, gaming unit, wearable computing device such as a watch or glasses, or any other computing device.

Processing unit 901 optionally comprises a microprocessor with one or more processing cores. Memory 902 optionally comprises DRAM or SRAM volatile memory. Non-volatile storage 903 optionally comprises a hard disk drive or flash memory array. Positioning unit 904 optionally comprises a GPS unit or GNSS unit that communicates with GPS or GNSS satellites to determine latitude and longitude coordinates for client device 100, usually output as latitude data and longitude data.

Transceiver 905 comprises one or more of a wired transceiver (such as a network interface compliant with a wired protocol such as that known by the trademark ETHERNET) and a wireless transceiver (such as an interface compliant with a wireless protocol such as those known by the trademarks BLUETOOTH, RFID, NFC, WIFI, 3G, 4G, 5G, and LTE, which can be identical to or different than wireless transceivers 303, 306, 307, 602, 701, and/or 702). Optionally, transceiver 905 comprises a plurality of wireless transceiver modules, such as wireless transceiver modules 909 and 910, each of which can engage in wireless communications using the same or different wireless protocols.

Image capture unit 906 optionally comprises one or more standard cameras (as is currently found on most smartphones and notebook computers). Optionally, image capture unit 906 can comprise a camera on one side of client device 601 and another camera on the opposite side of client device 900. Graphics processing unit 907 optionally comprises a controller or processor for generating graphics for display. Display 908 displays the graphics generated by graphics processing unit 907, and optionally comprises a monitor, touchscreen, or other type of display.

Figure 10:
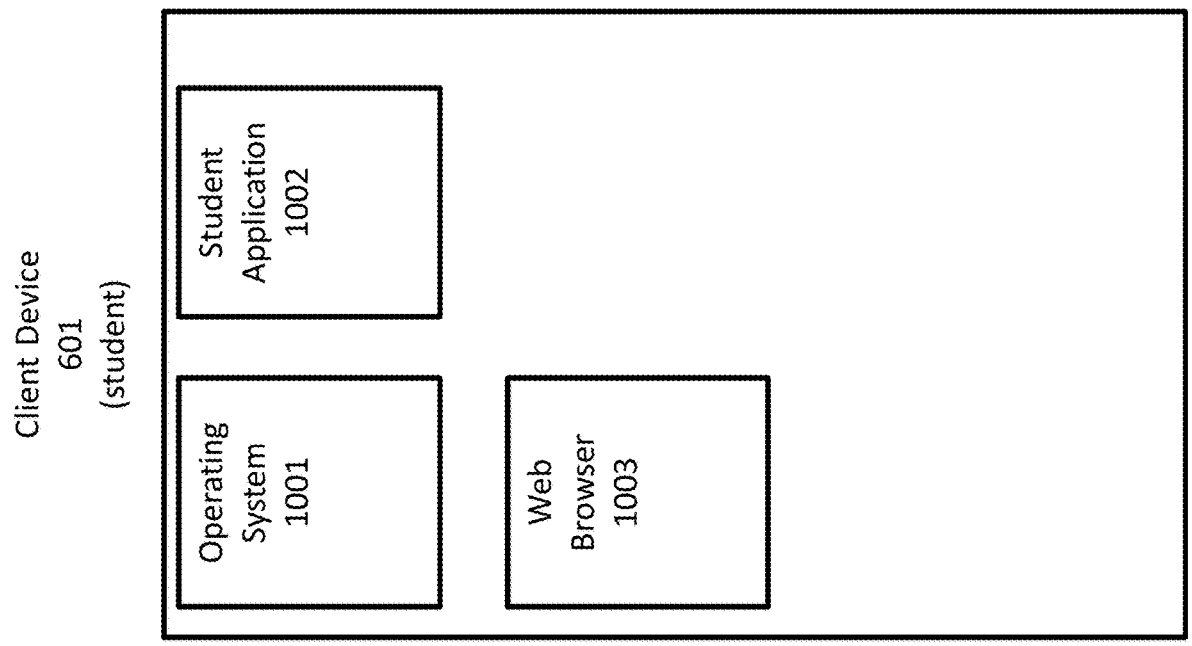
FIG. 10 depicts software components of a client device.

FIG. 10 depicts software components of client device 601 when used for a student in the embodiments disclosed herein. Client device 601 comprises operating system 1001 (such as the operating systems known by the trademarks "WINDOWS," "LINUX," "ANDROID," "IOS," or others), student application 1002, and web browser 1003 (such as the web browsers known by the trademarks "CHROME," "FIREFOX," and "INTERNET EXPLORER").

Student application 1002 comprises lines of software code executed by processing unit 901 and/or graphics processing unit 907 to perform the functions described below. For example, client device 601 can be a smartphone sold with the trademark "GALAXY" by Samsung or "IPHONE" by Apple, and student application 1002 can be a downloadable app installed on the smartphone. Client device 601 also can be a notebook computer, desktop computer, game system, or other computing device, and student application 1002 can be a software application running on client device 601.

Figure 11:
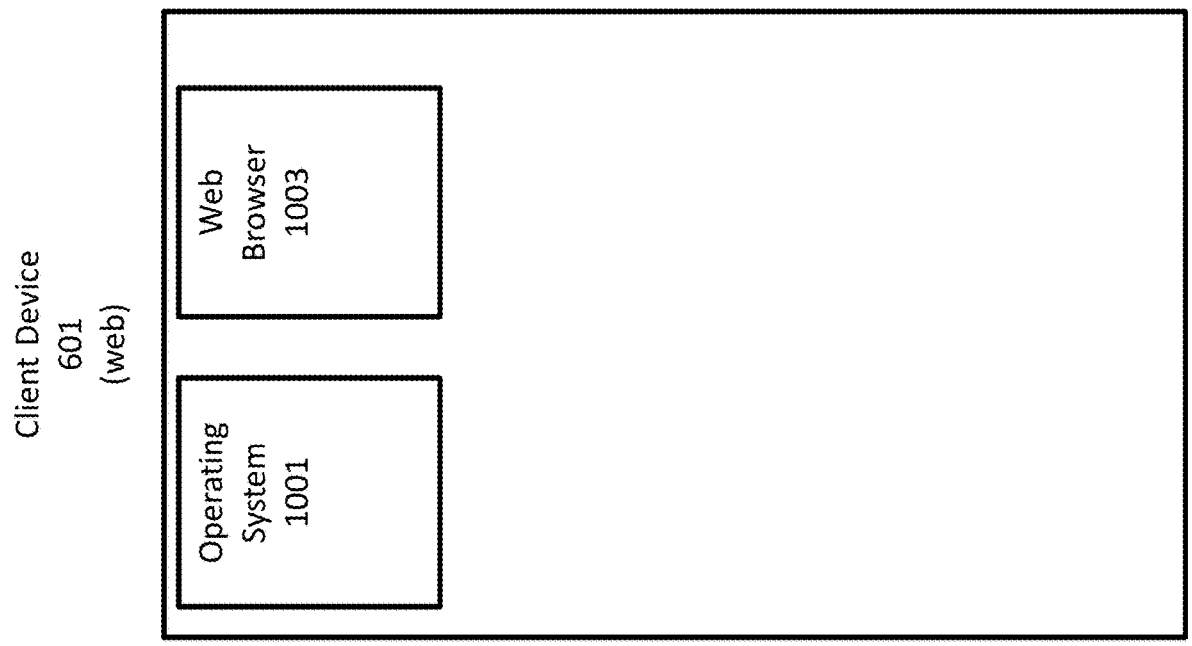
FIG. 11 depicts software components of another client device.

In the alternative, client device 601 can operate web browser 1003 and run code obtained from server 1400, such as by accessing a website or implementing an API. Student application 1002 and web browser 1003 running the aforementioned code each forms an important component of the embodiments described herein, and student application 1002 and web browser 1003 running such code is not known in the prior art. For convenience, when client device 601 is running student application 1002, it may be referred to herein as "client device 601 (student)." When client device 601 is running web browser 1003, it may be referred to herein as "client device 601 (web)" as shown in FIG. 11.

Figure 12:
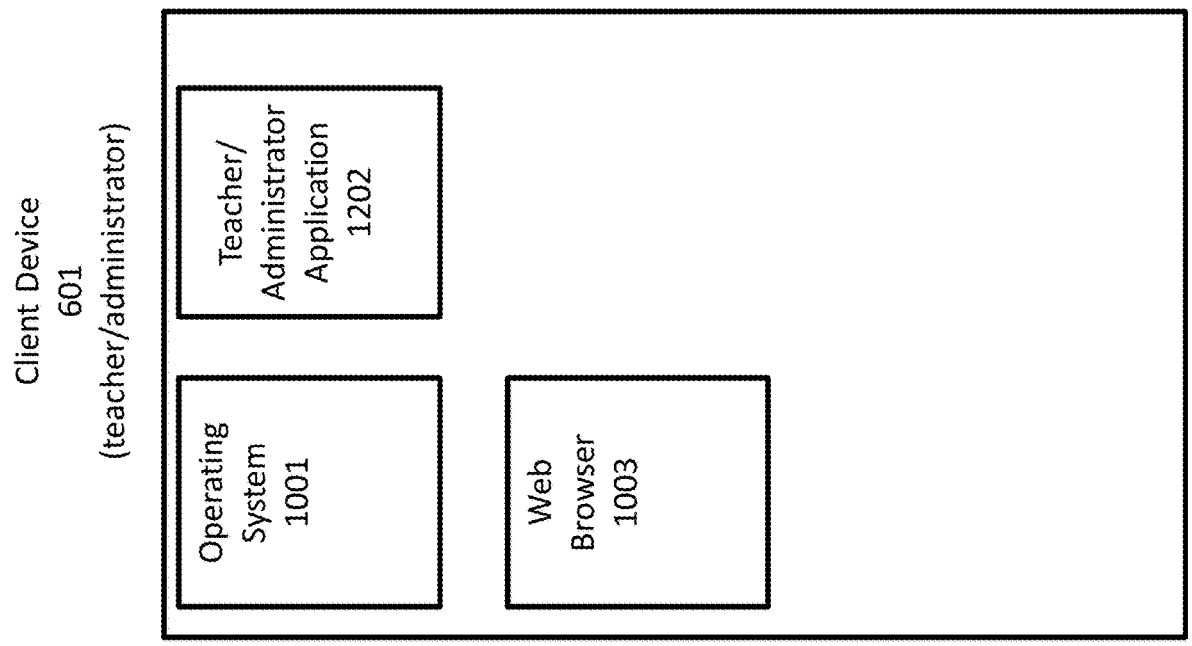
FIG. 12 depicts software components of another client device.

FIG. 12 depicts software components of client device 601 when used for a teacher or administrator in the embodiments disclosed herein. Client device 601 comprises operating system 1001 and web browser 1003 as in FIGS. 10 and 11 and teacher/administrator application 1202.

Teacher/administrator application 1202 comprises lines of software code executed by processing unit 901 and/or graphics processing unit 907 to perform the functions described below. For example, client device 601 can be a smartphone sold with the trademark "GALAXY" by Samsung or "IPHONE" by Apple, and teacher/administrator application 1202 can be a downloadable app installed on the smartphone. Client device 601 also can be a notebook computer, desktop computer, game system, or other computing device, and teacher/administrator application 1202 can be a software application running on client device 601.

In the alternative, client device 601 can operate web browser 1003 and run code obtained from server 1400, such as by accessing a website or implementing an API. Teacher/administrator application 1202 and web browser 1003 running the aforementioned code each forms an important component of the embodiments described herein, and teacher/administrator application 1002 and web browser 1003 running such code is not known in the prior art. For convenience, when client device 601 is running teacher/administrator application 1202, it may be referred to herein as "client device 601 (teacher/administrator)".

Figure 13:
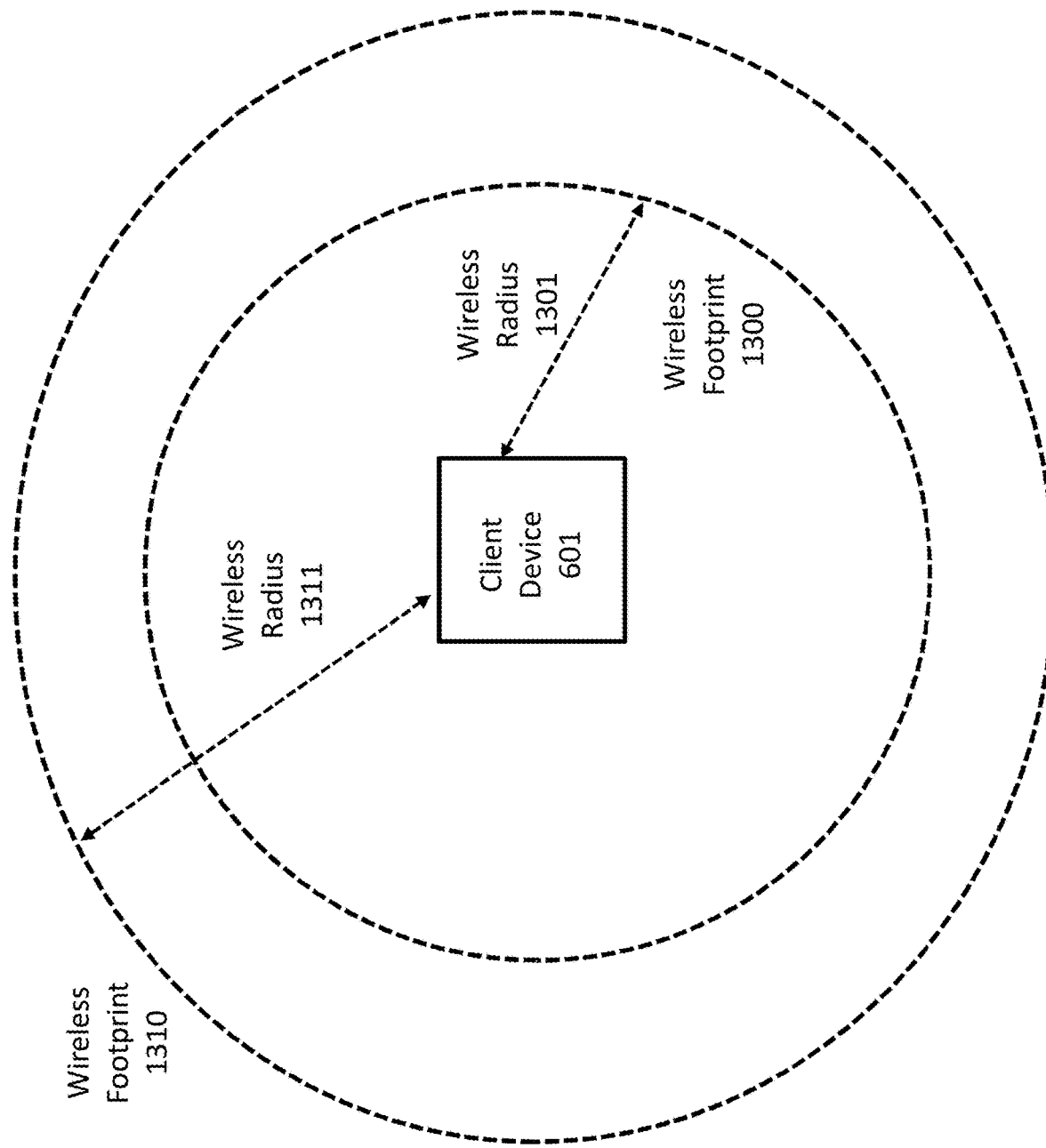
FIG. 13 depicts wireless footprints for a client device.

With reference to FIG. 13, in one embodiment, wireless transceiver module 909 in client device 601 (student, web, or teacher/administrator) communicates using a first wireless protocol (such as the wireless protocol known by the trademark BLUETOOTH) with devices within radius 1301 (where wireless footprint 1300 is the area in which wireless transceiver module 909 can communicate), and wireless transceiver module 910 communicates using a second wireless protocol (such as the wireless protocol known by the trademark WIFI) with gateway 202 within radius 1311 (where wireless footprint 1310 is the area in which wireless transceiver module 910 can communicate).

Figure 14:
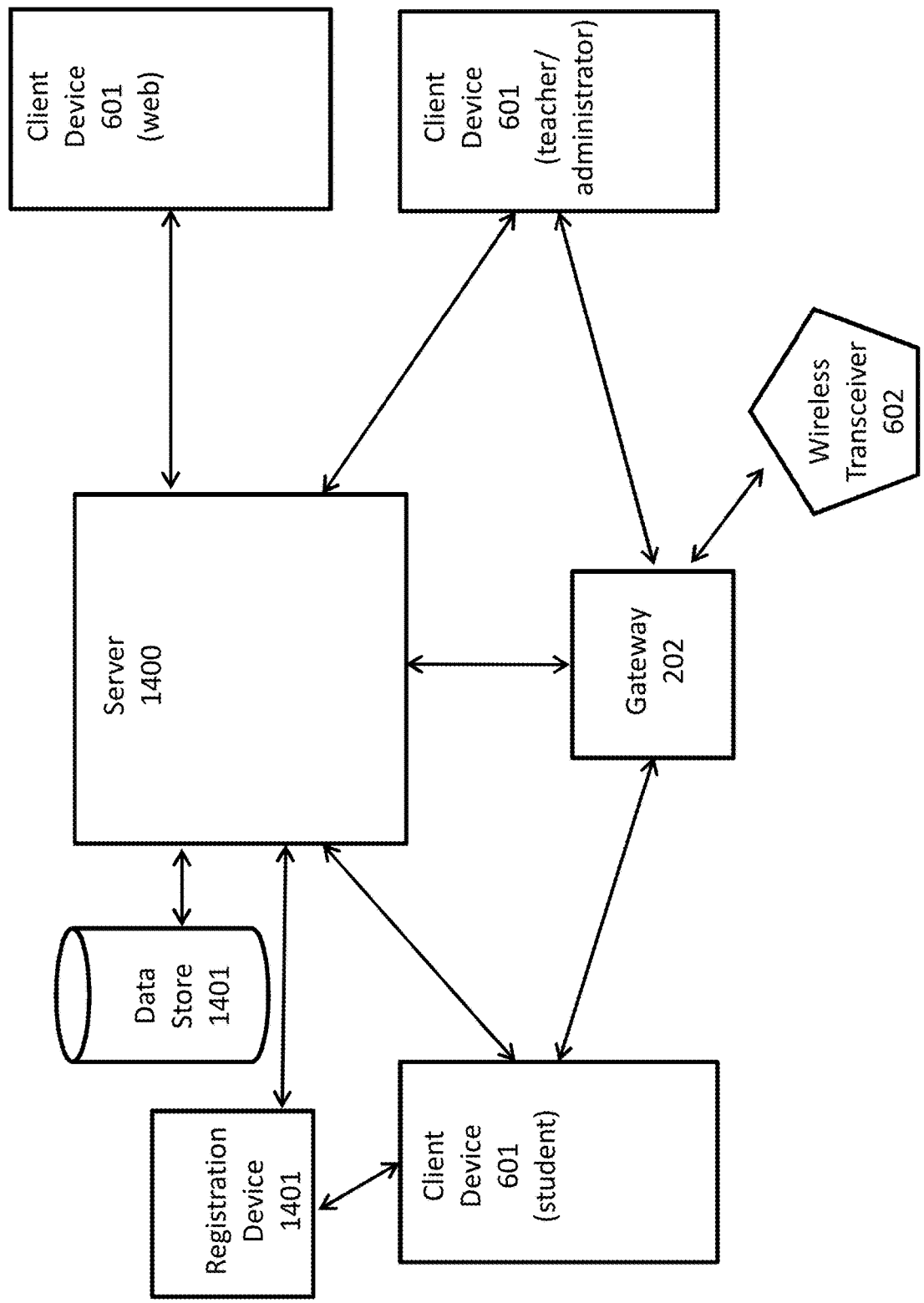
FIG. 14 depicts a server communicating with client devices, a wireless transceiver, and a gateway.

With reference to FIG. 14, exemplary client devices 601 (student), 601 (web), and 601 (teacher/administrator) communicate with server 1400, directly and/or indirectly through gateway 202, using transceiver 905 in each device. Exemplary wireless transceiver 602 communicates with server 1400 indirectly through gateway 202.

Each client device 601 and wireless transceiver 602 provides the following information to gateway 202, which then sends the information to server 1400:

Device ID;
RSSI;
Transmission power;
Advertising interval;
Telemetry data (temperature, light, accelerometer, battery life);
AoA—Angle of Arrival; and
AoD—Angle of Delivery Client device 601 and wireless transceiver 602 also can be configured to store information specific to the user with whom it is associated and can provide the following information to gateway 202, which then sends the information to server 1400:

Photo of user;
Name, classroom, parent name and phone number

Server 1400 comprises some or all of the same hardware components depicted in FIG. 9 for client devices 601, and for efficiency's sake, those hardware components will not be described again. In addition, server 1400 contains or is coupled to data store 1401, which comprises additional non-volatile storage and can be used to store a database and associated data. Data store 1401 can be contained within server 1400, it can be physically separate from server 1400 but local to server 1400 (e.g., connected by a direct link), or it can be located remotely from server 1400 (e.g., in the cloud). Server 1400 communicates with gateway 202 over a wired or wireless interface.

It is to be further understood that server 1400 will have access to other data typically available within schools, such as databases containing student, teacher, administration, and staff information, and server 1400 will be able to collect and display that information.

Figure 15:
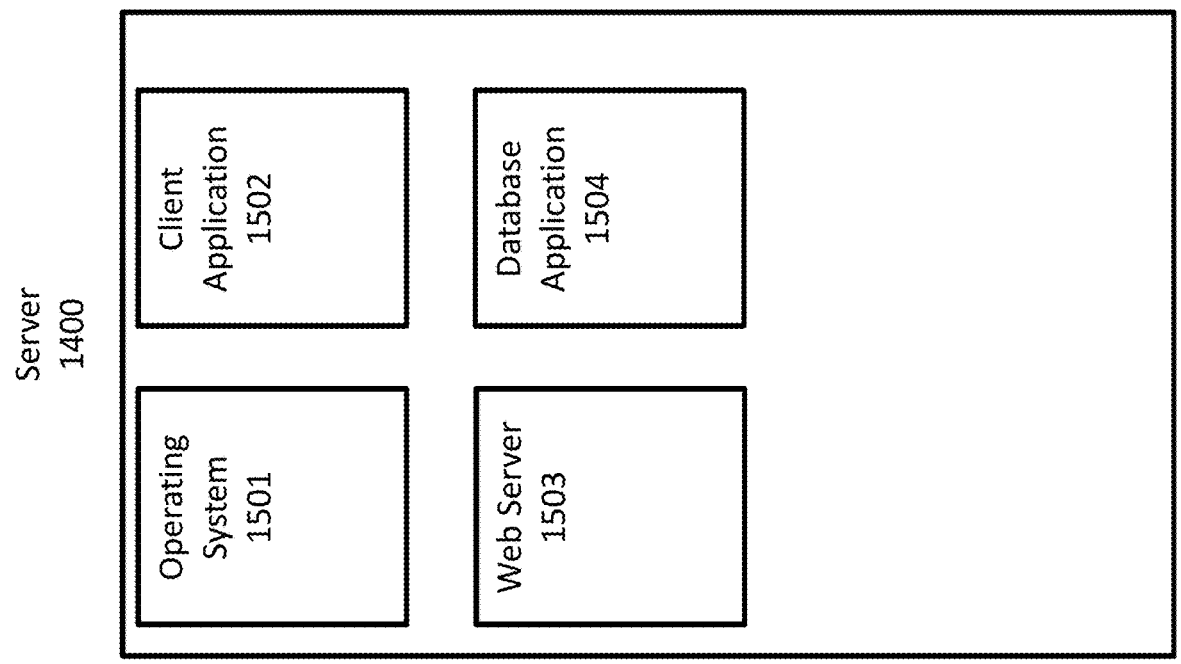
FIG. 15 depicts software components of a server.

Server 1400 optionally can obtain the following information from gateway 202 through an API or other mechanism:
Proximity approximations for detected client devices 601 and wireless transceivers 602 (immediate, near, far, or distance estimation);
Distance approximations for detected client devices 601 and wireless transceivers 602 (must calculate manually);
Any data broadcast form client devices 601 and wireless transceivers 602 (ID, RSSI, telemetry);
Timestamp for when packet from client device 601 or wireless transceiver 602 was received;
Location and telemetry data can be accessed as a stream through WebSocket/MQTT;
GPS coordinates of gateway 202;
AoA—Angle of Arrival; and
AoD—Angle of Delivery With reference to FIG. 15, server 1400 also comprises software components, such as operating system 1501, (such as the server-side operating systems known by the trademarks "WINDOWS" or "LINUX"), client application 1502, web server 1503 (such as the web server known by the trademark "APACHE"), and database application 1504 (such as a SQL database).

Client application 1502 comprises lines of software code executed by processing unit 901 and/or graphics processing unit 907 within server 1400 to perform the functions described below. Client application 1502 is designed to interface specifically with client devices 601 running student application 1002 or teacher/administrator application 1102. Client application 1502 forms an important component of the inventive aspect of the embodiments described herein, and client application 1502 is not known in the prior art.

Web server 1503 provides web functionality (such as a web site or APIs) that can be accessed by web browser 1003 in client device 601.

Database application 1504 utilizes data store 1401 to store data.

Figure 16:
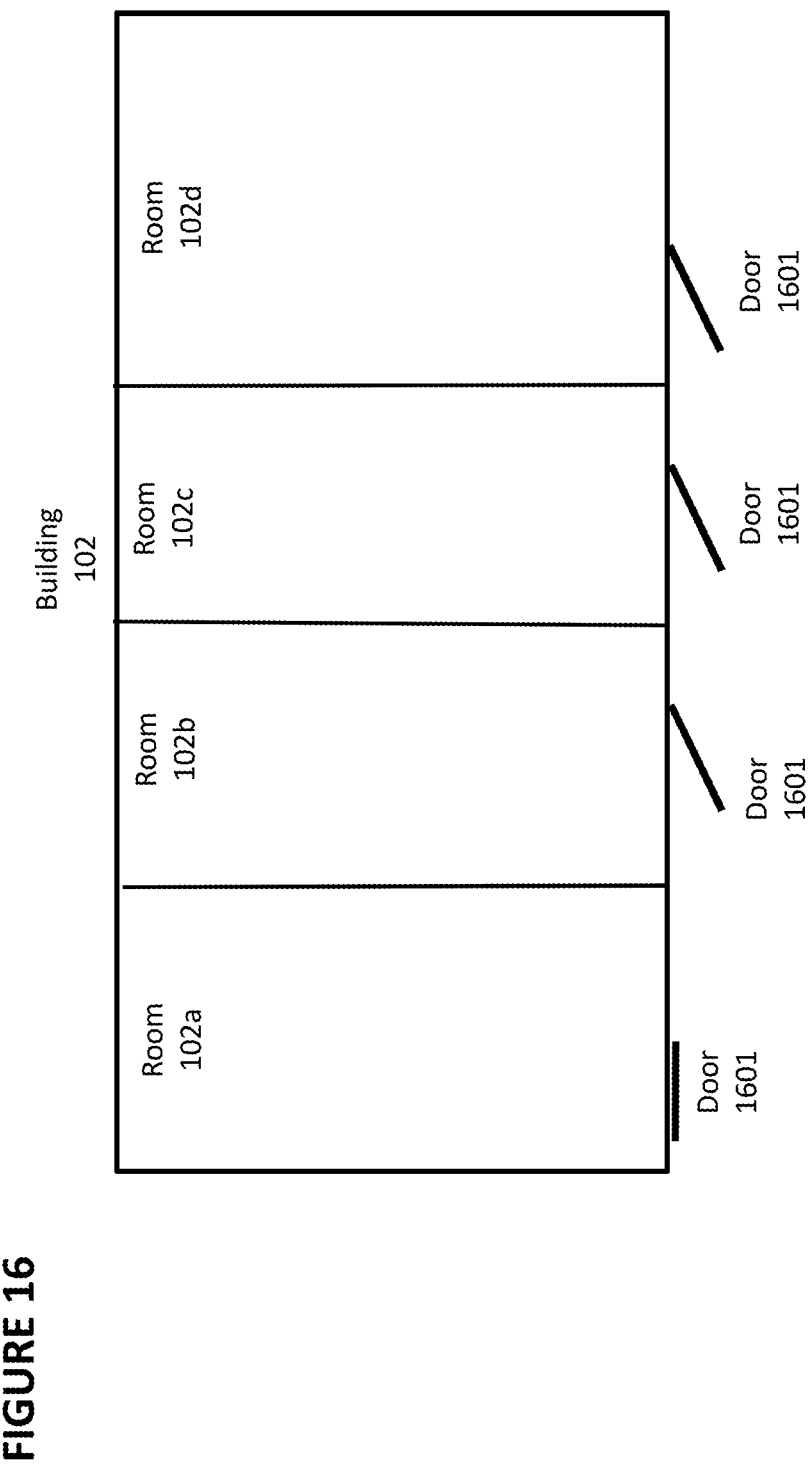
FIG. 16 depicts doors used in a building.

Another aspect of the embodiments will now be described with reference to FIGS. 16-17. FIG. 16 depicts building 102. Each of the rooms 102a, 102b, 102c, and 102d contains one or more doors 1601. At the particular time depicted in FIG. 16, door 1601 is closed for room 102a, and doors 1601 are open for rooms 102b, 102c, and 102d.

Figure 17:
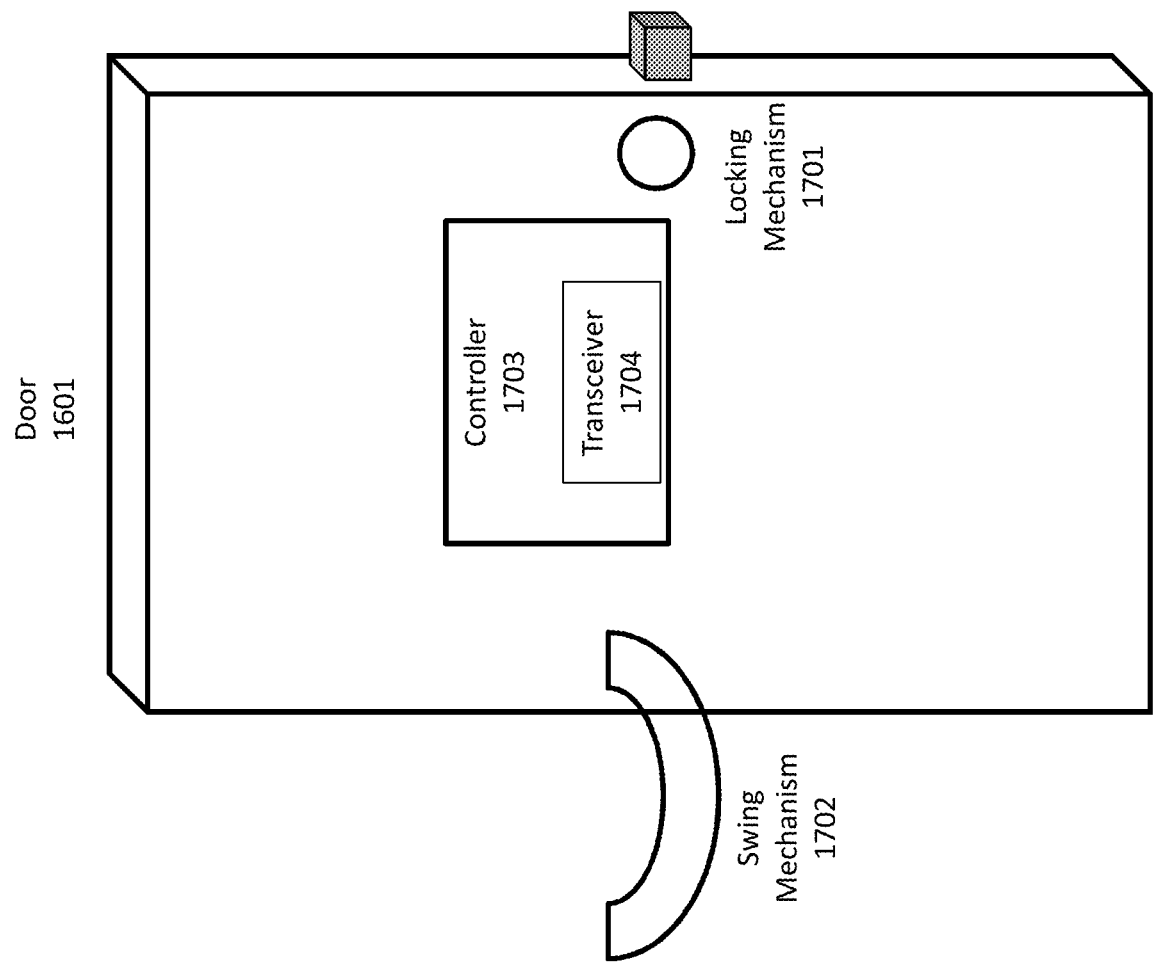
FIG. 17 depicts an embodiment of a door comprising a controller, swing mechanism, and locking mechanism.

FIG. 17 depicts additional detail for door 1601. Door 1601 comprises locking mechanism 1701, swing mechanism 1702, and controller 1703. Locking mechanism 1701 optionally comprises a conventional door knob and lock which can be opened from the outside with a key and from the inside with a locking knob. However, locking mechanism also has the ability to be controlled by controller 1703. Specifically, controller 1703 can cause locking mechanism 1701 to go into the locked position with or without human intervention. Swing mechanism 1702 has the ability to swing door 1601 from the closed position to the open position or to swing door 1601 from the open position to the closed position, without human intervention. Swing mechanism 1702 is controlled by controller 1703.

Controller 1703 is coupled to swing mechanism 1702 and locking mechanism 1701 through a wired connection or a wireless connection. Controller 1703 comprises wireless transceiver 1704, which can engage in wireless communications using the same or a different wireless protocol. For example, wireless transceiver module 1704 can engage in a wireless protocol such as the protocols known by the trademarks BLUETOOTH, ZIGBEE, RFID, WIFI, 3G, 4G, 5G, LTE, or other known protocols. Wireless transceiver 1704 can be identical to or different than wireless transceivers 303, 306, 307, 602, 701, 702, 909, and 910.

A configuration process for client devices 601, wireless transceivers 602, modules 201, and doors 1601 will now be described with reference to FIGS. 18-19.

Each legitimate user will register his or her client device 601 and/or wireless transceiver 602 with server 1400 or registration device 1401 (shown in FIG. 14). For example, this might be performed for all teachers, administrators, and students before a new school year starts or on the first day of school.

FIG. 18 depicts data structure 1800 that is created for each client device 601 and wireless transceiver 602 and stored in data store 1401. Data structure 1800 can comprise, for example, a table in a SQL database. Data structure 1800 can comprise fields containing the following types of data:
unique identifier 1801 for client device 601 or wireless transceiver 602;
phone number 1802 for client device 601 or for another device associated with the user
version number 1803, which is the version number of student application 1002 or teacher/administrator application 1202 installed on client device 601;
user name 1801, which is the name of the student, teacher, or administrator operating client device 601 or wireless transceiver 602;
parent or contact name 1805;
parent or contact name phone number 1806;
module identifier 1807, which is a unique identifier for module(s) 201 in whose wireless footprint 500/510 client device 601 or wireless transceiver 602 currently resides or most recently resided; and timestamp 1808, which is the date and time of the last communication received by such module(s) 201 from client device 601 or wireless transceiver 602.

Figure 19:
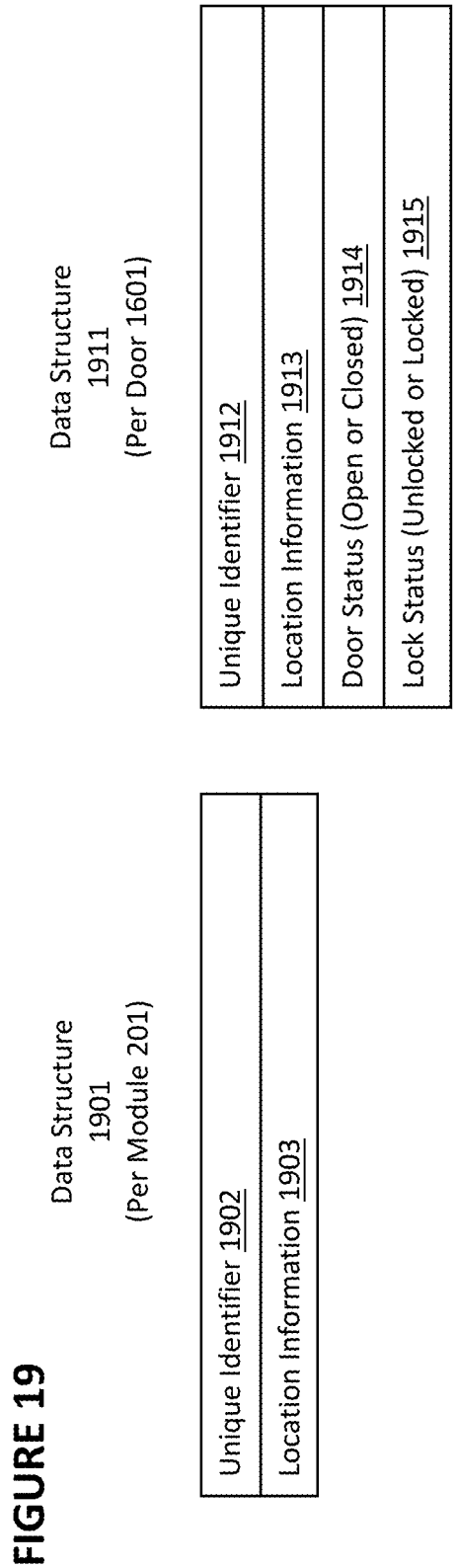
FIG. 19 depicts data structures created for each module and door.

With reference to FIG. 19, data structure 1901 is created for each module 201 and comprises fields containing the following types of data:

unique identifier 1902;

location information 1903, which is information that specifies the relative location of module 201 within premises 100. This is essential so that the location of client devices 601 and wireless transceivers 602 can be determined through their communications with modules 201. One option is for an installer to manually enter location information (which can be absolute longitude and latitude data, relative location data based on the configuration and layout of premises 100, or other information from which the relative location can be determined) into server 1400 for each module 201 at the time the module 201 is installed in premises 100. Another option is to use another computing device (for example, a client device 601 operated by the installer) containing positioning unit 904 to determine the GPS or GNSS coordinates of the module 201 at the time the module 201 is installed.

Data structure 1911 is created for each door 1601 and comprises fields containing the following types of data:

unique identifier 1912;

location information 1913, which is information that specifies the relative location of door 1601 within premises 100. This is essential so that the location of door 1601 can be known. One option is for an installer to manually enter location information (which can be absolute longitude and latitude data, relative location data based on the configuration and layout of premises 100, or other information from which the relative location can be determined) into server 1400 for each door 1601 at the time of installation. Another option is to use another computing device (for example, a client device 601 operated by the installer) containing positioning unit 904 to determine the GPS or GNSS coordinates of door 1601 at the time of installation. Another option is for location information 1913 to simply be a room number and/or building number in which door 1601 is installed;

door status 1914, which is whether the door is open or closed; and lock status 1915, which is whether locking mechanism 1701 is unlocked or locked.

Further operation of the embodiments will now be described with reference to FIGS. 20-24.

Figure 20:
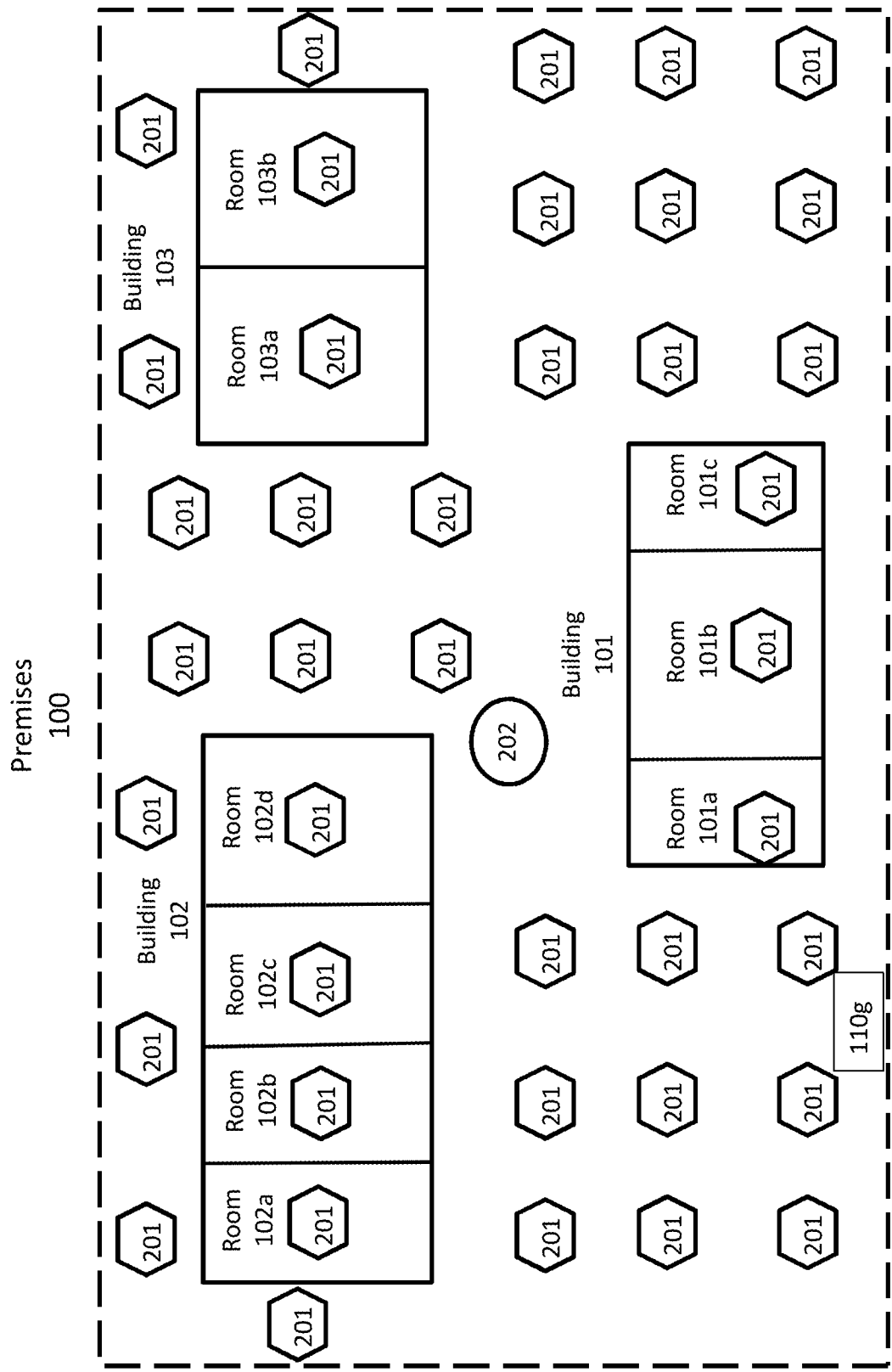
FIG. 20 depicts a person entering a premises.

In FIG. 20, person 110g enters premises 100. When person 110g enters into occupancy footprint 400 of one of the modules 201, that module will generate output 305, which will be communicated to server 1400 via wireless transceiver 303 or wired transceiver 304 and gateway 202, indicating the presence of a person within occupancy footprint 400. Server 1400 will wait to see if a client device 601 (student or teacher/administrator) or wireless transceiver 602 is detected on person 110g by wireless transceiver 303.

If no client device 601 or wireless transceiver 602 is detected, server 1400 will conclude that person 110g is not a registered user, meaning that person 110g might not have a legitimate reason for being on premises 100. Server 1400 optionally can issue an alert to cause an administrator or staff person to approach person 110g (as described below with reference to FIG. 21).

However, if a client device 601 or a wireless transceiver 602 is detected, then server 1400 receives the unique identifier 1801 for that client device 601 or wireless transceiver 602 and compares it against known records in data store 1401. If a match is found, then person 110g is deemed to be a registered user with a legitimate purpose on premises 100.

If the client device 601 contains student application 1002 or teacher/administrator application 1202, then such application will cause client device 601 to automatically communicate with any module 201 when client device 601 enters wireless footprint 500/510 That communication will include client device 601 sending unique identifier 1801 to any module 201 with which it is communicating. Unique identifier 1801 is an identification number or code that uniquely identifies client device 601 or wireless transceiver 602, such as a UUID (universally unique identifier) or GUID (globally unique identifier) that are known in the prior art. Optionally, client device 601 can send its GPS or GNSS coordinates obtained by positioning unit 804 (e.g., latitude data and longitude data) to module 201. Module 201 then will send unique identifier 1501 to server 1200 and optionally will send GPS or GNSS coordinates. Thereafter, client device 601 (student) will periodically re-send its unique identifier and optionally its GPS or GNSS data to any module 201 in whose footprint client device 601 (student) resides at the time.

In addition, wireless transceiver 602 will periodically send unique identifier 1801 to any module 201 whose wireless footprint 500 wireless transceiver 602 resides within and which is in range of wireless footprint 700 of wireless transceiver 602.

Figure 21:
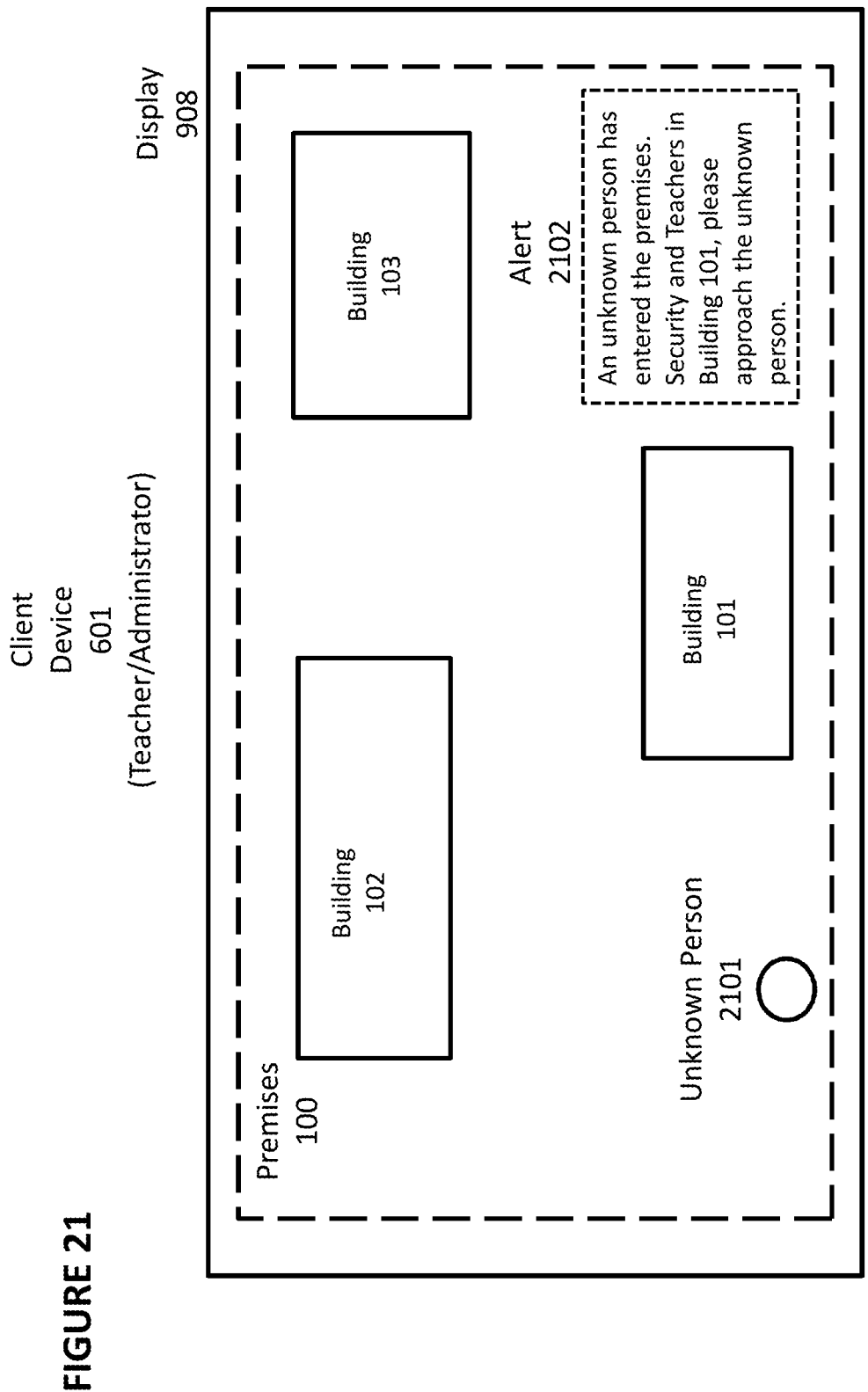
FIG. 21 depicts a user interface and alert indicating the presence of an unknown person within the premises.
Figure 22:
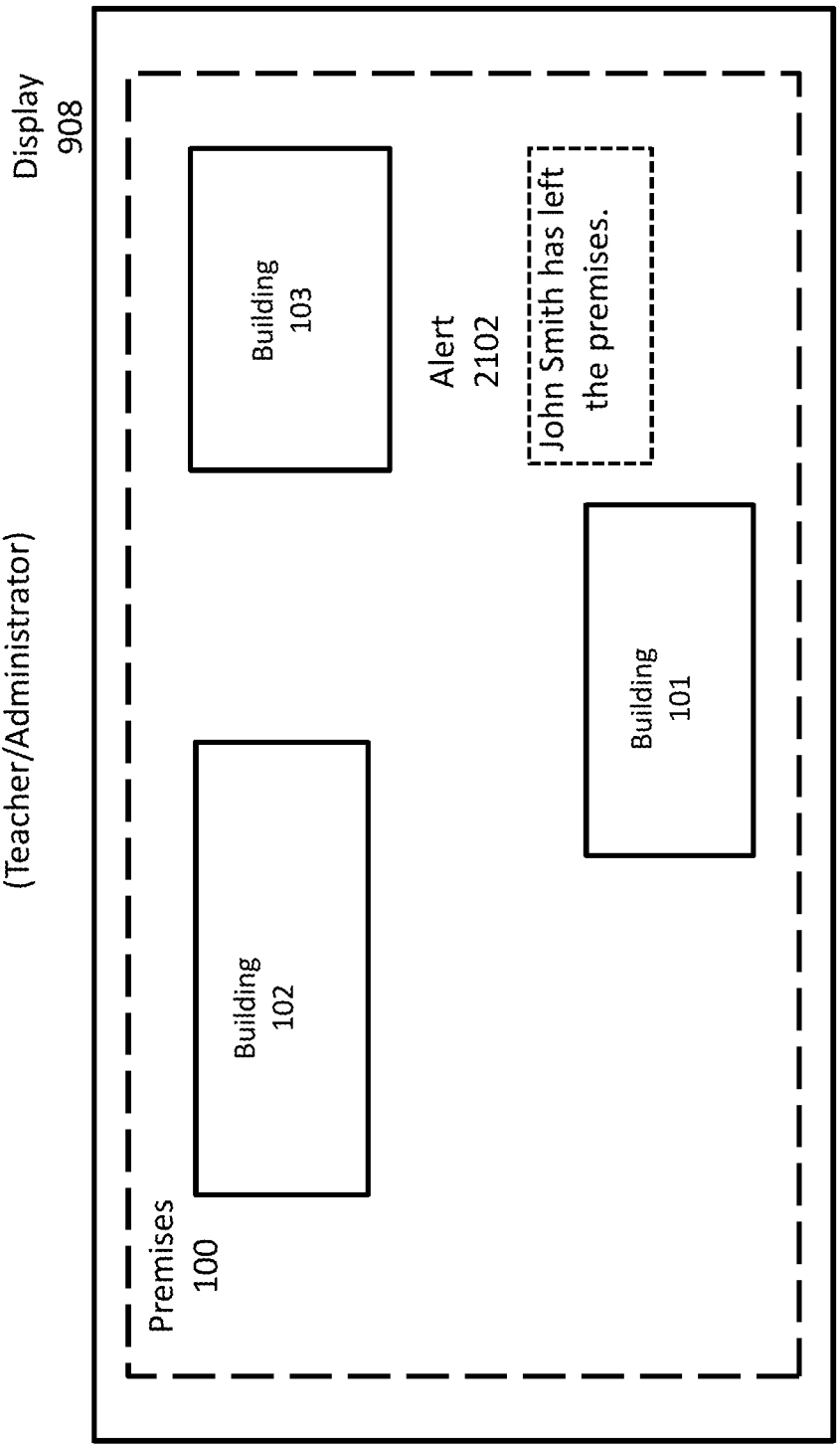
FIG. 22 depicts a user interface and alert indicating that a particular person has left the premises.

FIG. 21 depicts exemplary graphical images displayed on client device 601 (teacher/administrator) during the events described above with reference to FIG. 20. These images that can be generated on display 908 on client device 601 (teacher/administrator) by teacher/administrator application 1202. Teacher/administrator application 1202 generates a graphical depiction of premises 100 on display 908. When the unknown person is detected in the scenario of FIG. 20, server 1400 causes teacher/administration application 1202 to generate icon 2101 to represent an unknown person. Optionally, teacher/administrator application 1202 generates alert 2102, such as the text, "An unknown person has entered the premises. Security and Teachers in Building 101, please approach the unknown person."

In another aspect of the invention, if a certain amount of time, T, elapses with client device 601 or wireless transceiver 602 not sending its unique identifier to any module 201, then server 1400 can deduce that client device 601 or wireless transceiver 602 is no longer within wireless footprint 500/510 of any module 201, meaning that the client device 601 or wireless transceiver 602 is likely outside of premises 100. Server 1400 at that point can send an alert to client devices 601 operated by teachers and/or administrators because it is likely in that instance that the student has left the campus, as shown, for example, in FIG. 22, where alert 2102 states, "John Smith has left the premises."

Figure 23:
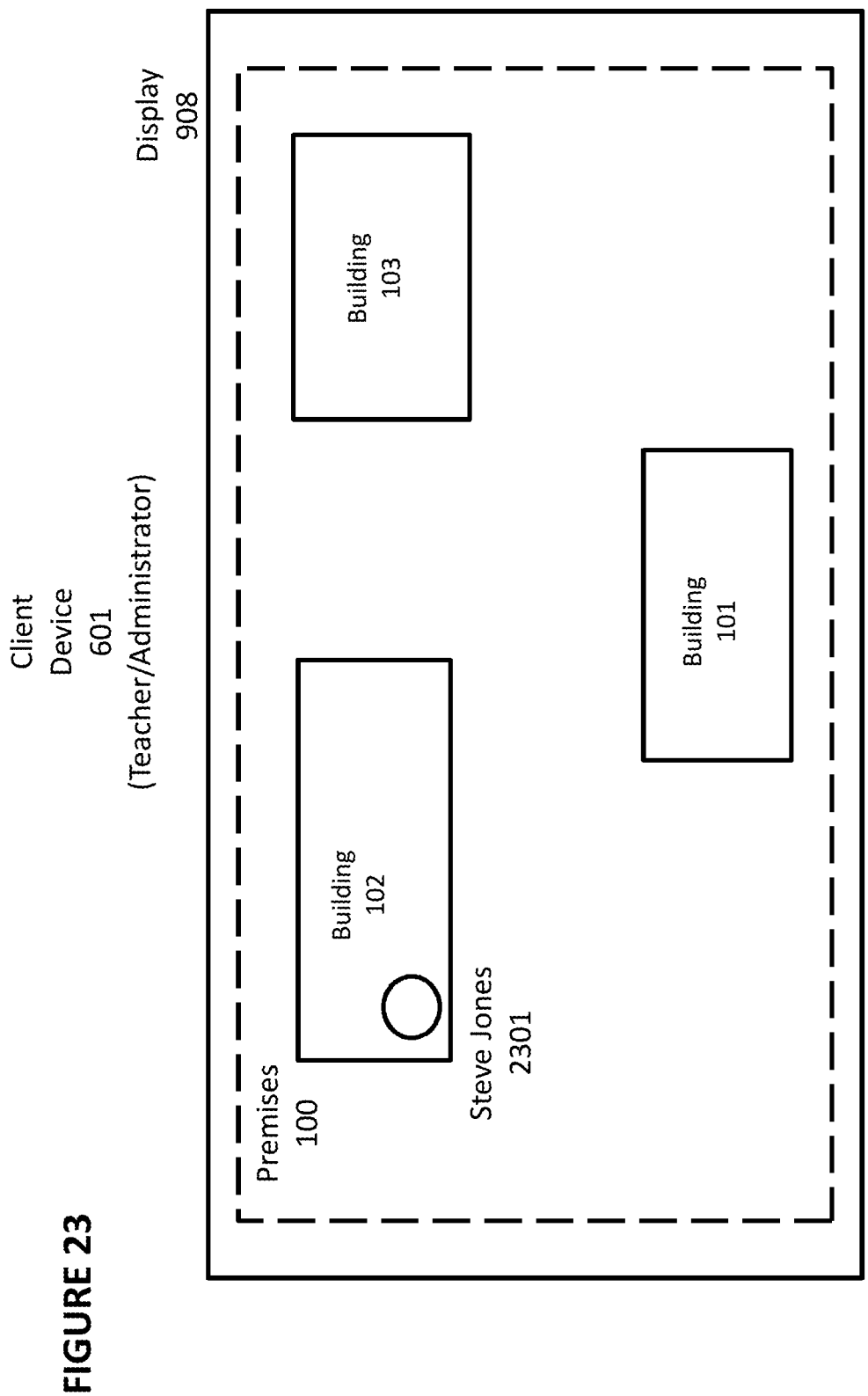
FIG. 23 depicts a user interface showing the relative location of a particular person within the premises.

In another aspect of the invention, with reference to FIG. 23, if a teacher or administrator wishes to physically locate a particular student (e.g., Steve Jones), he or she can input the student's name and server 1400 can cause teacher/administrator application 1202 to display icon 2301 to indicate the physical location of the student.

Figure 24:
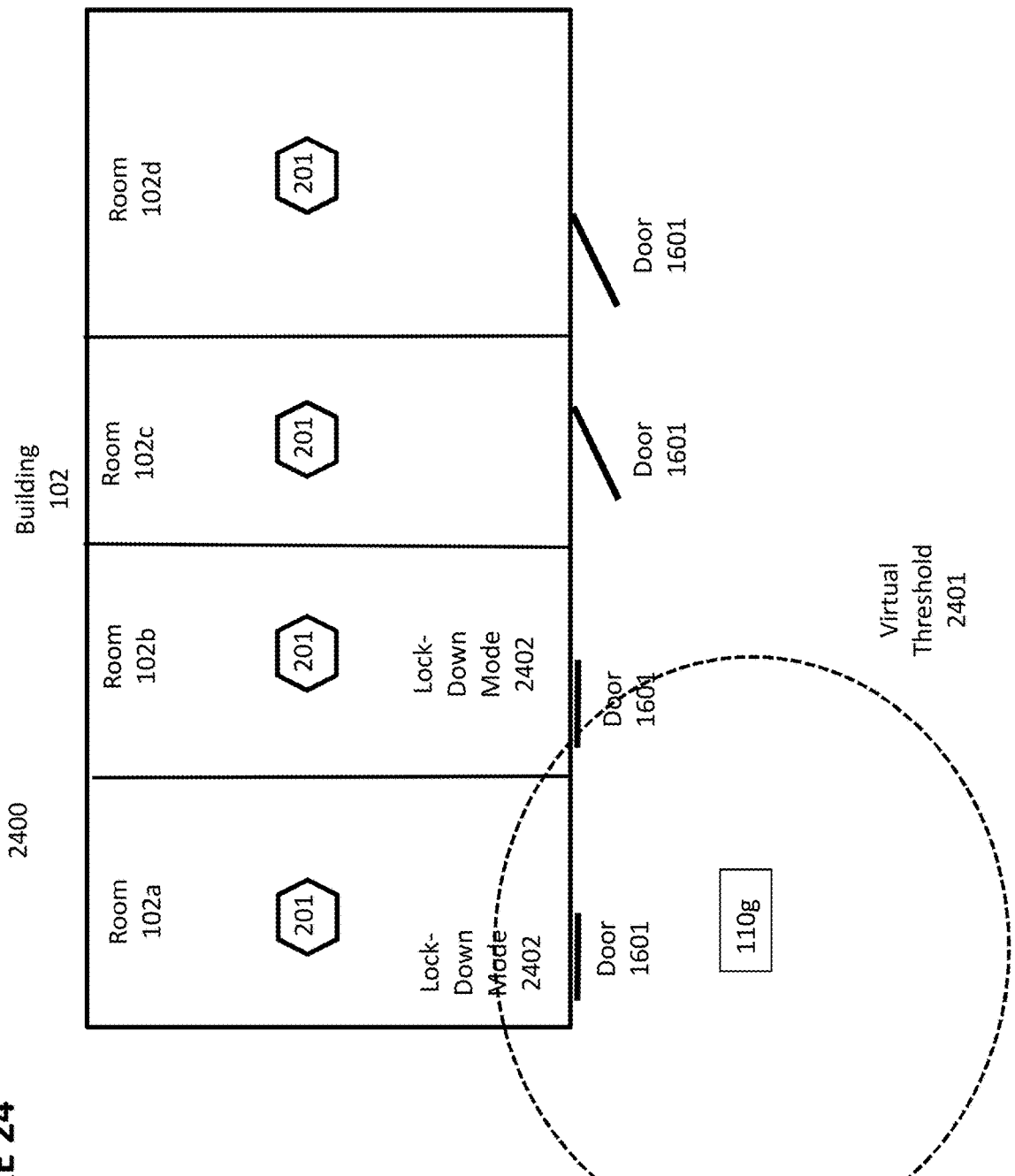
FIG. 24 depicts doors automatically closing and locking when the distance between the door and an unknown person falls below a predetermined threshold.

FIG. 24 depicts security protocol 2400 within premises 100. If person 110g is determined to be an unknown person, then security protocol 2400 is implemented. Or, in the alternative, if server 1400 generates an alert indicating the presence of an unknown person and if a teacher or administrator thereafter sees the unknown person and concludes that he or she is a security threat, then security protocol 2400 is implemented.

Under security protocol 2400, virtual threshold 2401 is established around person 110g. For example, virtual threshold 2401 can be 50 feet. As person 110g moves, when a particular room or building is within virtual threshold 2401, server 1400 optionally can instruct controller 1703 in door 601 to implement lock-down mode 2402, in which door 1601 is closed using swing mechanism 1702 and door 1601 is locked using locking mechanism 1701. Thus, in FIG. 24, doors 1601 are closed and locked for rooms 102a and 102b because those rooms are within virtual threshold 2401. However, rooms 102c and 102d are not yet within virtual threshold 2401, so their doors 1601 have not yet been closed and locked. In the alternative, a person interacting with server 1400 (such as a school principal or security director) can remotely instruct controller 1703 to lock door 1601, or a person interacting locally with controller 1703 can locally instruct controller 1703 to lock door 1601.

Optionally, lock-down mode 2402 can be implemented only if server 1400 first determines that all students and teachers who are supposed to be in that particular room are in fact in that room at the present time, or if a person (such as a teacher) in that room verifies that all students are present. For example, the lock down mode might not be implemented if a student is temporarily outside of the room.

FIG. 25 depicts data structure 2500, which contains a list of all registered users who are assigned to Room 102a during each time period during a school day. The first column contains the registered users assigned to Room 102a for time period 2501 (e.g., during the first period of the day, or during the entire day if the students stay in the same room all day). Here, the registered users in room 102a during time period 2501 are student A (who carries device with unique identifier 1801-A), student B (who carries device with unique identifier 1801-B), student F (who carries device with unique identifier 1801-F), and teacher H (who carries device with unique identifier 1801-H). On this particular day, student F is absent, and this is indicated in data structure 2500. With reference again to FIG. 24, lockdown mode 2402 optionally can be implemented in room 102a only if module 201 in room 102a detects the presence of unique identifiers 1801-A, 1801-B, and 1801-H in room 102a at that particular time.

It will be appreciated that the same process can be used to take attendance at the beginning of each class period. That is, the module 201 in each room can identify each device that is present in the room, and server 1400 can record that information for that period, which essentially is a way of taking attendance in that classroom for that period.

With reference to FIG. 25, server 1400 can collect and store real-time information regarding the status of each module 201 (including for modules 201 that are outside of a room). This information can be stored in data store 1401. For example, data structure 2500 and can comprise, for example, a table in a SQL database or data maintained in memory 902 of server 1400. This information can be used, for example, to quickly determine the location of a student at any particular time.

In example shown in FIG. 26, it is assumed that there are N modules 201 installed in premises 100, which are labeled module 201-1 through module 201-N. For each module 201, data structure 2600 indicates unique identifiers 1801 for all client devices 601 and wireless transceivers 602 within the wireless footprint 500/510 of the module 201 and the presence of any unknown persons within the occupancy footprint 400 of the module 201.

In the instance shown in FIG. 26, unique identifiers 1501-A, 1501-B, and 1501-H (corresponding to client devices 601 operated by student A, student B, and teacher H, respectively) are within the wireless footprint 500 of module 201-1. An unknown user and unique identifiers 1801-B (corresponding to student B) are within the wireless footprint 500 of module 201-2. Unique identifier 1801-Z (corresponding to teacher Z) is within the wireless footprint 500 of module 201-N. It should be noted that unique identifier 1801-B is shown for both modules 201-1 and 201-2 because in this particular instance, client device 601 with unique identifier 1501-B is within wireless footprint 500 of both modules 201-1 and 201-2 (and those modules also within the wireless footprint of client device 601).

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

What is claimed is:

1. A method of detecting an unknown person within a premises and performing a lockdown procedure, comprising:
   monitoring, by a plurality of modules, a premises, wherein each module comprises an occupancy sensor and a wireless transceiver;
   detecting, by an occupancy sensor in one of the plurality of modules, a person within the premises;
   attempting to obtain, by a wireless transceiver in the one of the plurality of modules, a device identifier for a computing device in proximity to the person; and
   when no device identifier is obtained, performing a lockdown procedure comprising automatically closing a door based on a location of the person, wherein the lockdown procedure is initiated after a server confirms the presence of a predetermined set of persons in a room secured by the door
   wherein each of the plurality of modules further comprises a mechanical interface for attaching to and receiving power from a light socket.

2. The method of claim 1, wherein the door comprises a swing mechanism that performs the step of automatically closing the door.

3. The method of claim 2, wherein the door further comprises a controller that controls the swing mechanism.

4. The method of claim 1, wherein the door comprises a locking mechanism that performs the step of automatically locking the door.

5. The method of claim 4, wherein the door further comprises a controller that controls the locking mechanism.

6. The method of claim 4, wherein the door further comprises a transceiver and the lockdown procedure is initiated by an instruction received by the transceiver from a server over a wireless network.

7. A system for detecting an unknown person and performing a lockdown procedure, the system comprising:
a plurality of modules positioned within a premises, each of the plurality of modules comprising an occupancy sensor and a wireless transceiver;
a wireless gateway for communicating with one or more of the plurality of modules; and
a server coupled to the wireless gateway, wherein the server is configured to instruct a wireless transceiver in a first module located in an open space in the premises to locate a computing device within a wireless footprint of the first module when the occupancy sensor in the first module detects a person within an occupancy footprint of the first module and to implement a lockdown procedure when no computing device is located, the lockdown procedure comprising automatically closing and locking a door in proximity to the person;
wherein each of the plurality of modules further comprises a mechanical interface for attaching to and receiving power from a light socket.

8. The system of claim 7, further comprising:
a client device for generating a user interface depicting the premises and the relative location of the detected person.

9. The system of claim 7, wherein the door comprises a swing mechanism automatically closing the door.

10. The system of claim 9, wherein the door further comprises a locking mechanism that performs the step of automatically locking the door.

11. The system of claim 10, wherein the door further comprises a controller that controls the locking mechanism.

12. The system of claim 11, wherein the door further comprises a transceiver for communicating with the wireless gateway.

* * * * *